United States Patent
Brown et al.

(10) Patent No.: US 10,965,379 B2
(45) Date of Patent: Mar. 30, 2021

(54) COHERENT RECEIVER FOR FREE SPACE OPTICAL COMMUNICATIONS AND LIDAR

(71) Applicant: 8 Rivers Capital, LLC, Durham, NC (US)

(72) Inventors: William J. Brown, Durham, NC (US); Hannah Clark, Durham, NC (US); Miles R. Palmer, Chapel Hill, NC (US)

(73) Assignee: 8 RIVERS CAPITAL, LLC., Durham, NC (US)

( * ) Notice: Subject to any disclaimer, the term of this patent is extended or adjusted under 35 U.S.C. 154(b) by 0 days.

(21) Appl. No.: 16/706,233

(22) Filed: Dec. 6, 2019

(65) Prior Publication Data
US 2020/0186258 A1 Jun. 11, 2020

Related U.S. Application Data

(60) Provisional application No. 62/776,638, filed on Dec. 7, 2018.

(51) Int. Cl.
*H04B 10/61* (2013.01)
*G01S 7/4863* (2020.01)
*H04B 10/11* (2013.01)

(52) U.S. Cl.
CPC .......... *H04B 10/615* (2013.01); *G01S 7/4863* (2013.01); *H04B 10/11* (2013.01); *H04B 10/616* (2013.01)

(58) Field of Classification Search
CPC .... H04B 10/505; H04B 10/11; H04B 10/615; H04B 10/616; G01S 7/4863
See application file for complete search history.

(56) References Cited

U.S. PATENT DOCUMENTS

| | | | |
|---|---|---|---|
| 7,339,714 B1 | 3/2008 | Islam | |
| 8,188,418 B1 * | 5/2012 | Kondratko | G01S 7/4861 250/214 LS |
| 8,204,378 B1 * | 6/2012 | Marsland, Jr. | G01S 3/783 398/65 |

(Continued)

OTHER PUBLICATIONS

Pavelchek et al., "Control Method for Free-Space Optical Communication System," U.S. Appl. No. 60/241,419, filed Oct. 17, 2000.

(Continued)

*Primary Examiner* — Dzung D Tran
(74) *Attorney, Agent, or Firm* — Womble Bond Dickinson (US) LLP

(57) ABSTRACT

An optical receiver is provided that includes a detector array of multiple detector elements, and processing circuits coupled to the multiple detector elements. The detector array is configured to receive light from an external source, mix the light with light from a local oscillator to generate a spatial fringe across the detector array. The multiple detector elements are configured to convert respective portions of the spatial fringe incident on the multiple detector elements to corresponding electrical signals. The processing circuits are configured to process the electrical signals. This includes the processing circuits configured to sum those of the corresponding electrical signals from one or more of the multiple detectors, and subtract the sum from a second sum of those of the corresponding electrical signals from one or more other of the multiple detectors.

24 Claims, 16 Drawing Sheets

(56) References Cited

U.S. PATENT DOCUMENTS

| | | | | |
|---|---|---|---|---|
| 10,122,471 | B2* | 11/2018 | Bock | H04B 10/11 |
| 2011/0222048 | A1 | 9/2011 | Englert et al. | |
| 2012/0050750 | A1 | 3/2012 | Hays et al. | |
| 2018/0267250 | A1* | 9/2018 | Hosseini | G02F 1/011 |
| 2019/0011558 | A1* | 1/2019 | Crouch | G01S 17/26 |
| 2019/0018115 | A1* | 1/2019 | Schmitt | G01S 17/42 |
| 2019/0173587 | A1* | 6/2019 | Hendrickson | G02B 27/48 |
| 2019/0391243 | A1* | 12/2019 | Nicolaescu | G01S 7/4817 |

OTHER PUBLICATIONS

Pavelcheck et al., "Establishment and Maintenance of Optical Links Between Optical Links Between Optical Transceiverr Nodes in Free-Space Optical Communication Networks," U.S. Appl. No. 60/241,315, filed Oct. 16, 2000.

Paudel et al., "Modelling of Free Space Optical Link for Ground-to-Train Communications Using a Gaussian Source," IET Optoelectronics, Feb. 2013, 18 pages.

* cited by examiner

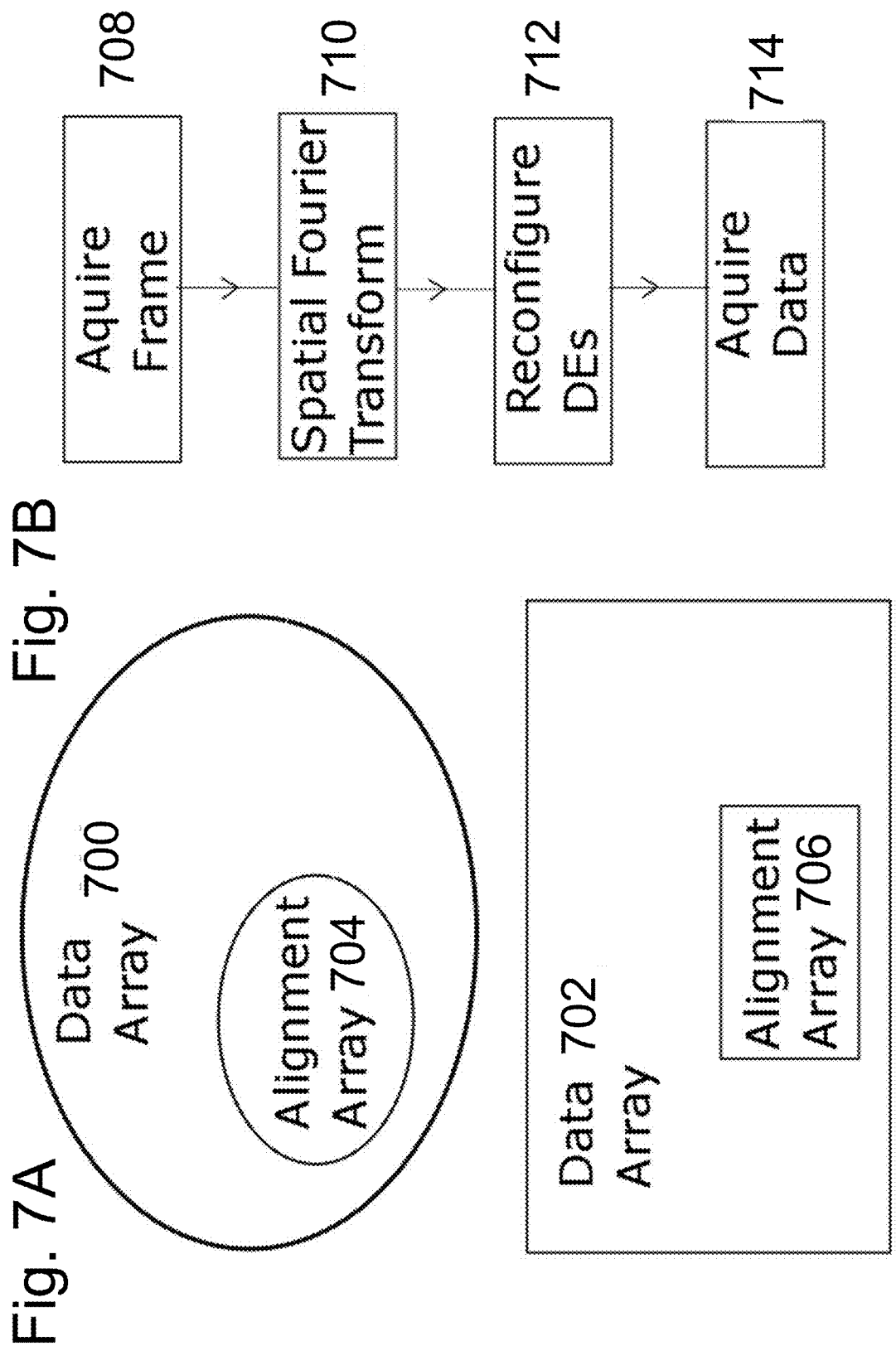

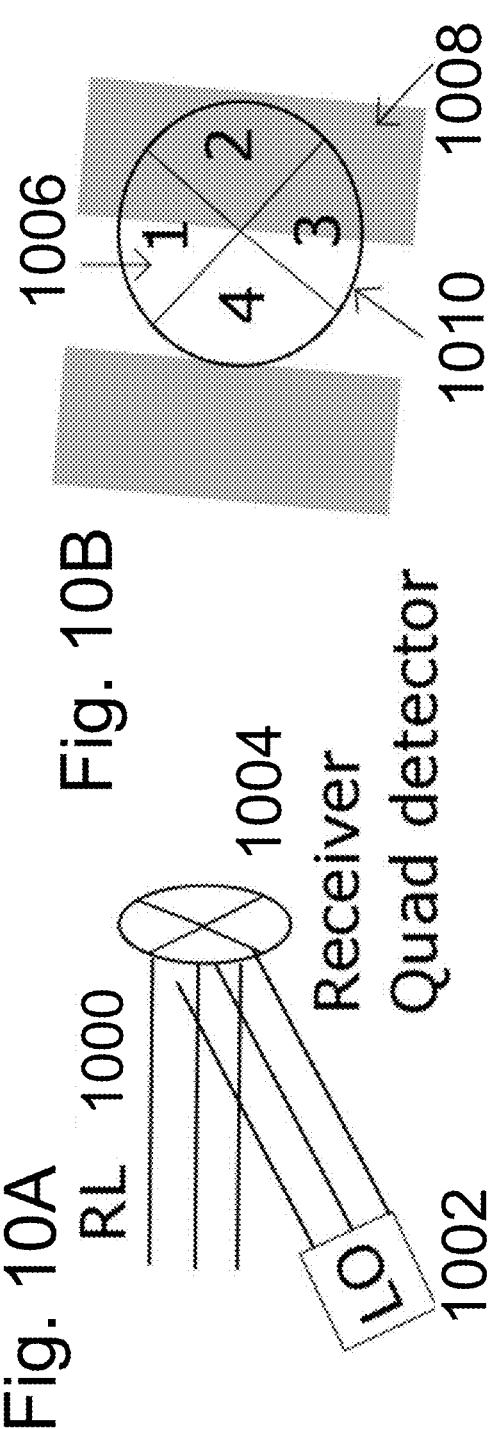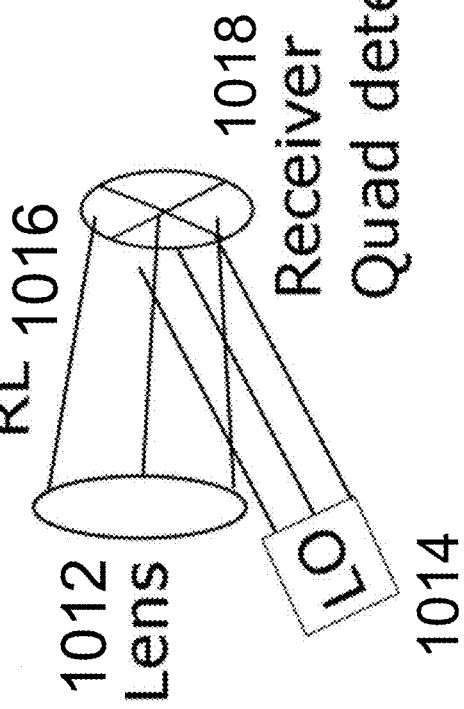

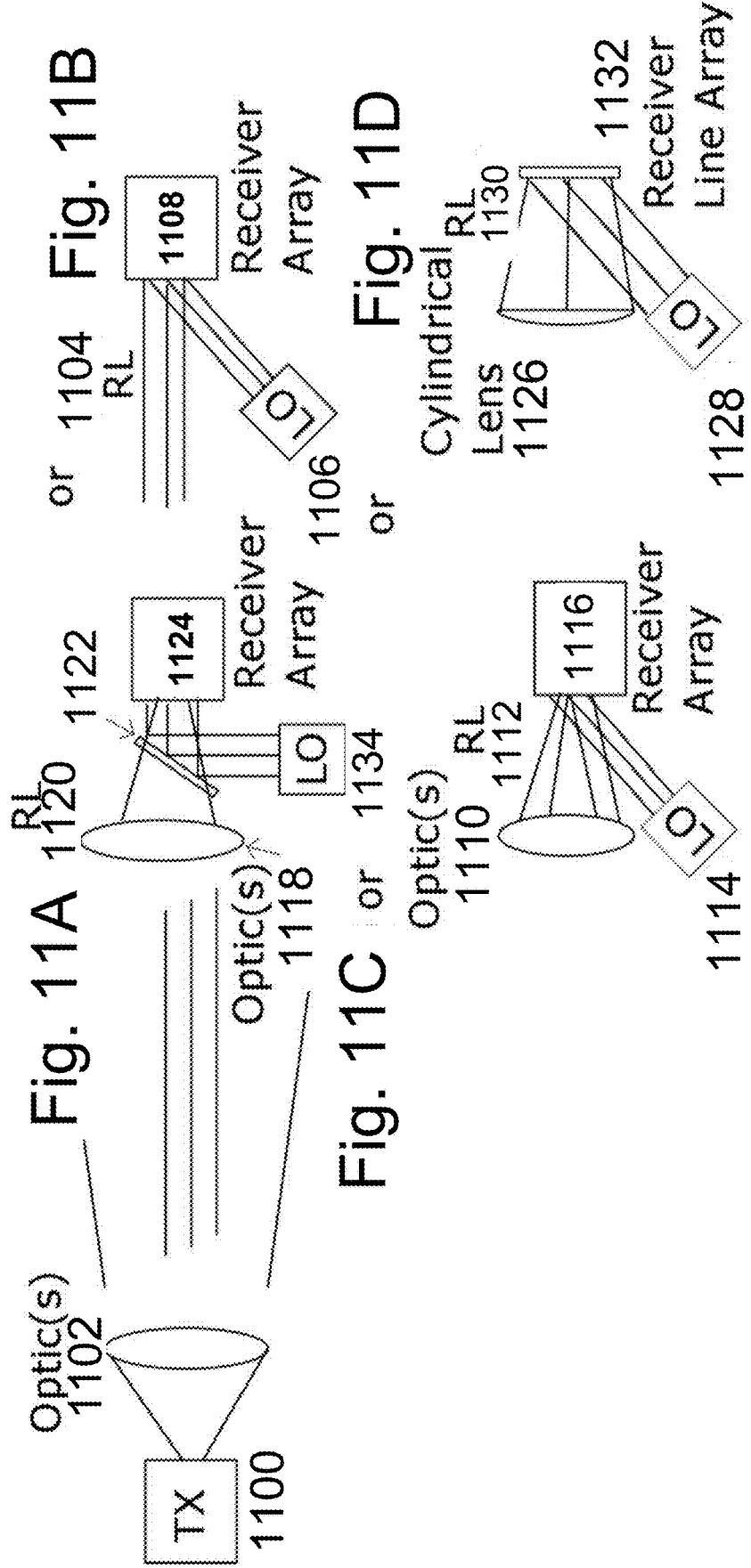

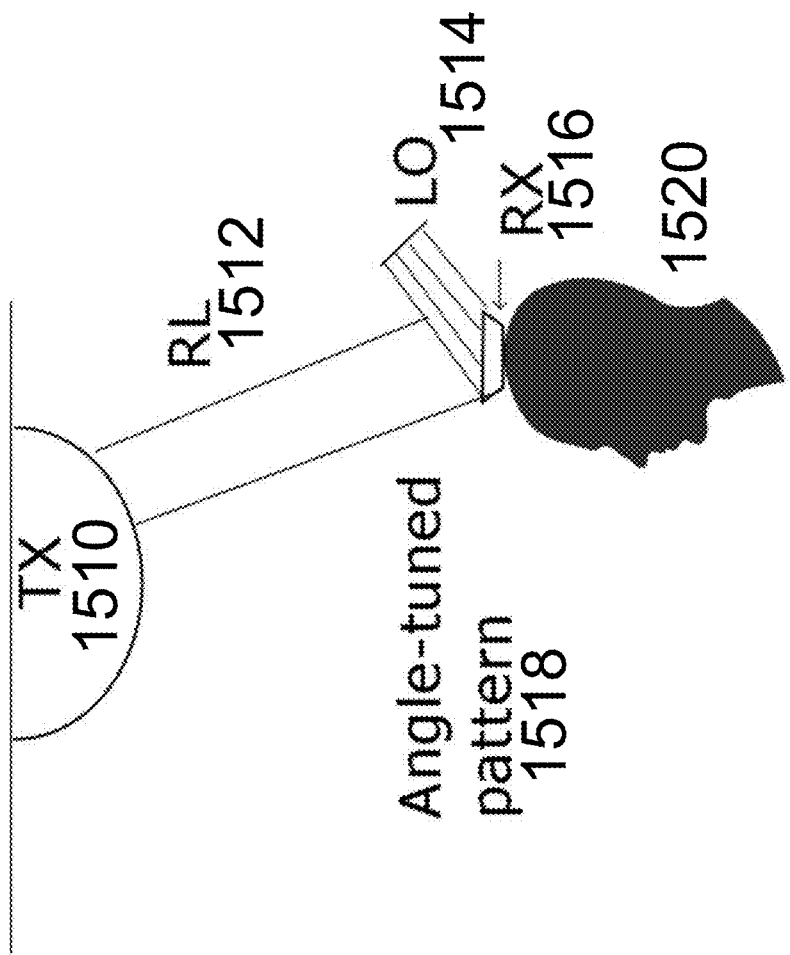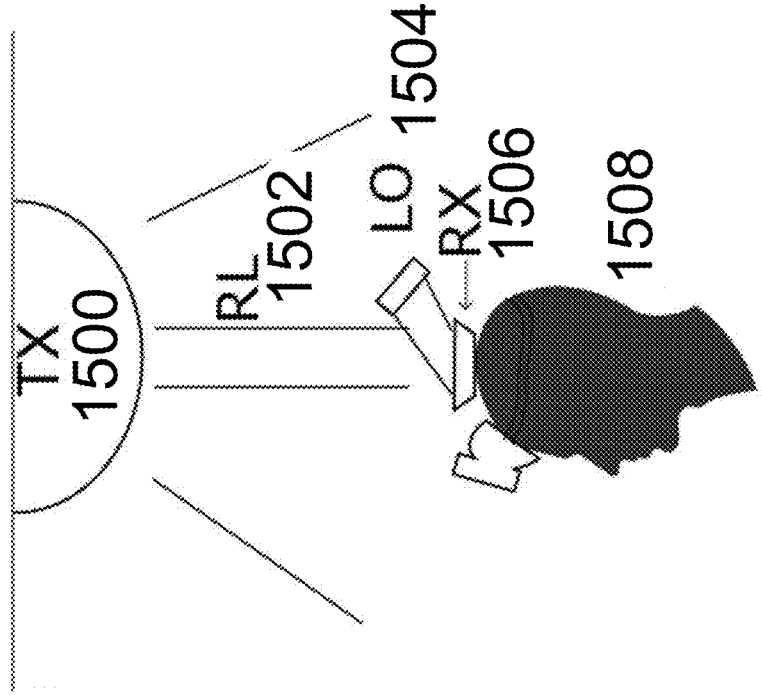

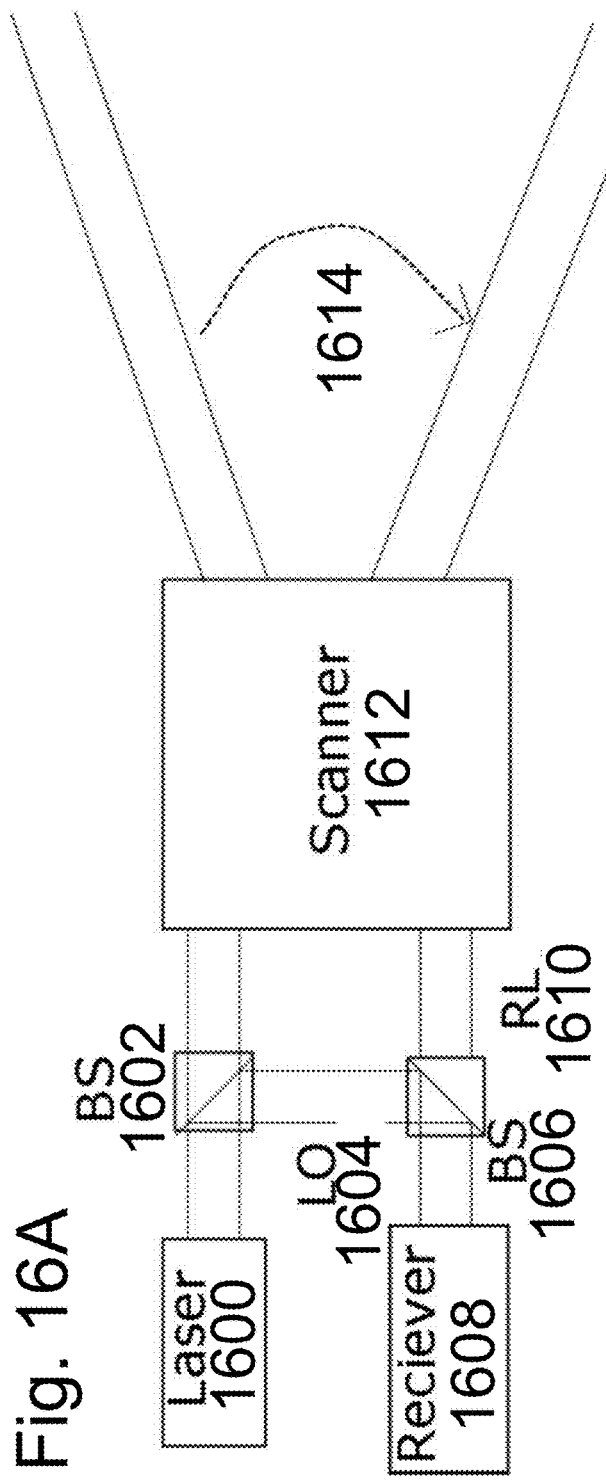
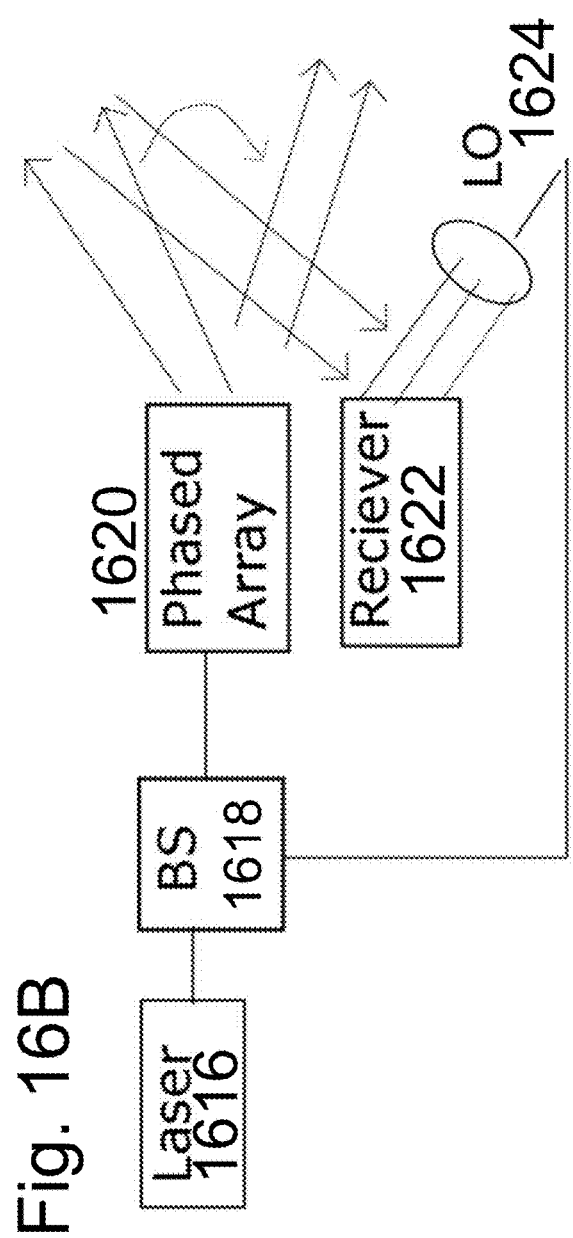
Fig. 16A
Fig. 16B

COHERENT RECEIVER FOR FREE SPACE OPTICAL COMMUNICATIONS AND LIDAR

CROSS-REFERENCE TO RELATED APPLICATION(S)

The present application claims priority to U.S. Provisional Patent Application No. 62/776,638, entitled: Coherent Receiver for Free Space Optical Communication and LIDAR, filed on Dec. 7, 2019, the content of which is incorporated herein by reference in its entirety.

TECHNOLOGICAL FIELD

The present disclosure relates generally to a novel type of coherent receiver using spatial coherence properties and programmable detector arrays for receiving high speed data.

BACKGROUND

Significant work has been done in the field of coherent receivers, with the majority of systems using fiber optics or waveguides. These systems are inherently single mode (transverse or lateral) or nearly so. Coupling light from free space into single mode optics (of any type) is quite difficult and leads to excess loss and very tight alignment tolerances. Furthermore, single mode optics have very small cross sections and acceptance angles, or etendue, limiting the amount of light that can be collected. For free space optical systems, this often becomes the limiting factor in system performance.

Prior art for this work stems from several different distinct fields, although none of the works directly influence the ideas, implementations and methods described herein. Prior art fields that are related include the theory and implementation of coherent optical receivers, free-space optics with coherent and partially coherent beams, visible light communications and visible light communications using sensors and detector arrays, and coherent detection on CMOS and CCD arrays.

BRIEF SUMMARY

Example implementations of this disclosure are directed to coherent detection in a receiver. Coherent detection encodes information in the phase of the signal light and recovers it at the receiver using direct frequency detection of the beat note between the received light and a local oscillator (heterodyne) or between the received light and itself (homodyne). We propose a local oscillator at the receiver along with a detector array where the individual elements are small enough to detect spatial interference between the two light beams and can be summed to multiple sets of receive electronics that are fast enough to cover the frequency difference between the local oscillator and the incoming light and thereby capture the encoded information.

The receiver will have a laser, which we will refer to as the local oscillator (LO) and will mix the LO with light received from the transmitter onto a detector array (received light or RL). The detector array will include multiple elements where each element may be less than half the size of the fringe generated by the LO and the RL. Each detector element (DE) will need to have a bandwidth that encompasses the frequency difference between the LO and the RL and the additional bandwidth needed encoding the data.

The DEs may be connected to a switch fabric which is turn connected to a set of receive circuits, which may include a transimpedance amplifier and other electronics and/or signal processing (processing circuit, PC). There may be a summation stage in front of some or all of the PCs. The switch fabric may be reconfigured or programmed to couple DEs to different PCs.

The LO and RL will form a fringe pattern across the array of DEs. The fringe pattern is then programmed into the switch fabric so that the various phases of the fringe pattern all sum one or more PC's. The outputs of the PC may then be summed and/or differenced to get the fringe contrast and phase. The phase may encode the bits of information and summed and differenced PC's may be capable of reading changes in that phase using the DEs of the array.

This configuration has at least 6 advantages for free space optical communications and LIDAR systems. (1) Use of LO increases the signal by at least factor of 2 compared to OOK type systems, (2) System may be limited by the shot noise in the LO and for high enough LO powers becomes insensitive or less sensitive to ambient light, (3) higher launch powers can be used since it is typically easier to phase modulate high power lasers as compared to amplitude modulation, (4) higher data rates are enabled by phase modulation, (5) acceptance angle direction and range can be tuned by configuring the fringe alignment and spacing in the detector array, and (6) atmospheric distortions may be accommodated for.

Example implementations reframe the main ideas in the fields of both imaging and coherent detection for communication. In the field of imaging, the receivers are typically large arrays, such as those found in megapixel cameras. Each pixel has multiple bit depth levels and may also encodes color bits, meaning that each pixel carries multiple bits of information. The array itself can be millions of pixels with frame rates typically in the 10-200 Hz (frames per second) range. This is considered a "slow" data rate, however the amount of data transferred in each frame is very large, making the overall data rate very high (on the order of several gigabits per second (Gbps) or more).

Conversely, in communications systems, including coherent detection systems, the data transfer rate is typically quite high with each data unit being a single or a few bits. Coherent detection systems to date have been based on detecting the beat note, or difference frequency between a local oscillator laser and the incoming received signal or between the incoming received signal and a time delayed copy (or portion) of itself. This type of coherence detection uses the frequency or phase changes over time to encode bits.

Here, example implementations of the present disclosure use parts of both of these ideas, namely, it shifts the coherence properties from the temporal regime to the spatial one and uses a detector array, such as those used in imaging to read out the spatial coherence information at a very high rate. This is advantageous for many reasons described herein and an altogether novel way to approach coherent high-speed data transmission that can be used for a broad range of applications.

The present disclosure therefore includes, without limitation, the following example implementations.

Some example implementations provide an optical receiver comprising: a detector array of multiple detector elements, the detector array configured to receive light from an external source, mix the light with light from a local oscillator to generate a spatial fringe across the detector array, and the multiple detector elements configured to convert respective portions of the spatial fringe incident on the multiple detector elements to corresponding electrical signals; and processing circuits coupled to the multiple detector elements, and configured to process the electrical signals, including the processing circuits configured to sum those of the corresponding electrical signals from one or more of the multiple detectors, and subtract the sum from a second sum of those of the corresponding electrical signals from one or more other of the multiple detectors.

In some example implementations of the optical receiver of any preceding example implementation, or any combination of any preceding example implementations, the detector array includes a quad detector to enable configured to enable the optical receiver to track the external source.

In some example implementations of the optical receiver of any preceding example implementation, or any combination of any preceding example implementations, the optical receiver further comprises a switch fabric via which the multiple detector elements are coupled to the processing circuits, the switch fabric programmable to couple the multiple detector elements to different ones of the processing circuits.

In some example implementations of the optical receiver of any preceding example implementation, or any combination of any preceding example implementations, the optical receiver further comprises one or more switches configured to connect adjacent detector elements of the multiple detector elements In some example implementations of the optical receiver of any preceding example implementation, or any combination of any preceding example implementations, the multiple detector elements are silicon-based detector elements.

In some example implementations of the optical receiver of any preceding example implementation, or any combination of any preceding example implementations, the detector array is built on Complementary metal-oxide-semiconductor (CMOS) technology in which each detector element of the silicon-based detector elements includes a set of transistors operable as a switch to couple the detector element to one or more of the processing circuits.

In some example implementations of the optical receiver of any preceding example implementation, or any combination of any preceding example implementations, the detector array is built on charge-coupled device (CCD) technology in which the corresponding electrical signals are electric currents, the sum subtracted from the second sum produces a result electric current that is then digitized.

In some example implementations of the optical receiver of any preceding example implementation, or any combination of any preceding example implementations, the multiple detector elements are InGaAs-based detector elements.

In some example implementations of the optical receiver of any preceding example implementation, or any combination of any preceding example implementations, the optical receiver further comprises a feedback circuit coupled to the detector and configured to determine a metric from the corresponding electrical signals that indicates an effect of atmospheric distortion on the light from the external source, the feedback circuit further configured to configure at least some of the multiple detector elements to compensate for the effect of atmospheric distortion.

In some example implementations of the optical receiver of any preceding example implementation, or any combination of any preceding example implementations, the optical receiver further comprises a feedback circuit coupled to the detector and configured to determine a metric from the corresponding electrical signals that indicates an effect of atmospheric distortion on the light from the external source, wherein the feedback circuit is further configured to communicate the metric to the external source, and the external source configured to apply a pre-distortion to further light according to the metric such that the atmospheric distortion has at least reduced the pre-distortion when received at the detector array.

In some example implementations of the optical receiver of any preceding example implementation, or any combination of any preceding example implementations, the optical receiver further comprises multiple local oscillators including the local oscillator, the multiple local oscillators having different frequencies and usable with light having different transmitted wavelengths.

In some example implementations of the optical receiver of any preceding example implementation, or any combination of any preceding example implementations, the multiple detector elements are in number greater than 100 thousand, 1 million, 10 million, 100 million, or 1 billion, each of which has a speed greater than 0.1 gigabits per second (Gbps), 1 Gbps, 10 Gbps, 100 Gbps, 1,000 Gbps, 10,000 Gbps, or 100,000 Gbps, thereby enabling the optical receiver to achieve an optical reception speed of greater than 1e13 bits per second (bps), 1e14 bps, 1e15 bps, 1e16 bps, 1e17 bps, 1e18 bps, 1e19 bps, 1e20 bps, 1e21 bps, 1e22 bps, or 1e23 bps.

Some example implementations provide a system for augmented or virtual reality comprising the optical receiver of any preceding example implementation, or any combination of any preceding example implementations, and further comprising an augmented or virtual reality headset equipped with the optical receiver to enable optical communication with at least the external source that is a base station.

Some example implementations provide a system comprising: a source of light configured to emit light; a beamsplitter or splitter optic configured to split the light into light that is launched toward a target, and light that is used as a local oscillator; a detector array of multiple detector elements, the detector array configured to receive light incident on the target in a return path, mix the light incident on the target with the light used as the local oscillator to generate a spatial fringe across the detector array, and the multiple detector elements configured to convert respective portions of the spatial fringe incident on the multiple detector elements to corresponding electrical signals; and processing circuits coupled to the multiple detector elements, and configured to process the electrical signals, including the processing circuits configured to sum those of the corresponding electrical signals from one or more of the multiple detectors, and subtract the sum from a second sum of those of the corresponding electrical signals from one or more other of the multiple detectors.

In some example implementations of the system of any preceding example implementation, or any combination of any preceding example implementations, the system is configured as a light detection and ranging (LIDAR) system.

In some example implementations of the system of any preceding example implementation, or any combination of any preceding example implementations, the detector array includes a quad detector to enable configured to enable the optical receiver to track the external source.

In some example implementations of the system of any preceding example implementation, or any combination of any preceding example implementations, the system further comprises a switch fabric via which the multiple detector elements are coupled to the processing circuits, the switch fabric programmable to couple the multiple detector elements to different ones of the processing circuits.

In some example implementations of the system of any preceding example implementation, or any combination of any preceding example implementations, the system further comprises one or more switches configured to connect adjacent detector elements of the multiple detector elements.

In some example implementations of the system of any preceding example implementation, or any combination of any preceding example implementations, the multiple detector elements are silicon-based detector elements.

In some example implementations of the system of any preceding example implementation, or any combination of any preceding example implementations, the detector array is built on Complementary metal-oxide-semiconductor (CMOS) technology in which each detector element of the silicon-based detector elements includes a set of transistors operable as a switch to couple the detector element to one or more of the processing circuits.

In some example implementations of the system of any preceding example implementation, or any combination of any preceding example implementations, the detector array is built on charge-coupled device (CCD) technology in which the corresponding electrical signals are electric currents, the sum subtracted from the second sum produces a result electric current that is then digitized.

In some example implementations of the system of any preceding example implementation, or any combination of any preceding example implementations, the multiple detector elements are InGaAs-based detector elements.

In some example implementations of the system of any preceding example implementation, or any combination of any preceding example implementations, the system further comprises a feedback circuit coupled to the detector and configured to determine a metric from the corresponding electrical signals that indicates an effect of atmospheric distortion on the light from the external source, the feedback circuit further configured to configure at least some of the multiple detector elements to compensate for the effect of atmospheric distortion.

In some example implementations of the system of any preceding example implementation, or any combination of any preceding example implementations, the system further comprises multiple local oscillators including the local oscillator, the multiple local oscillators having different frequencies and usable with light having different transmitted wavelengths.

These and other features, aspects and advantages of the present disclosure will be apparent from a reading of the following detailed description together with the accompanying figures, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying figures which illustrate, by way of example, the principles of the described implementations.

BRIEF DESCRIPTION OF THE FIGURE(S)

Having thus described the disclosure in the foregoing general terms, reference will now be made to the accompanying figures, which are not necessarily drawn to scale, and wherein:

FIGS. 7A and 7B illustrate respectively one or more sections of a receiver used for alignment, and a flow diagram of a process in which some or all of an array is read out, according to various example implementations;

FIGS. 10A, 10B, 10C and 10D illustrate a quad detector according to various example implementations;

FIGS. 11A, 11B, 11C, 11D, 11E and 11F illustrate example receiver configurations, according to various example implementations;

FIGS. 15A and 15B shows systems for augmented reality (AR)/virtual reality (VR)—augmented or virtual reality, according to various examples; and FIGS. 16A and 16B illustrate systems for light detection and ranging (LIDAR), according to various example implementations.

DETAILED DESCRIPTION

Figure 1:
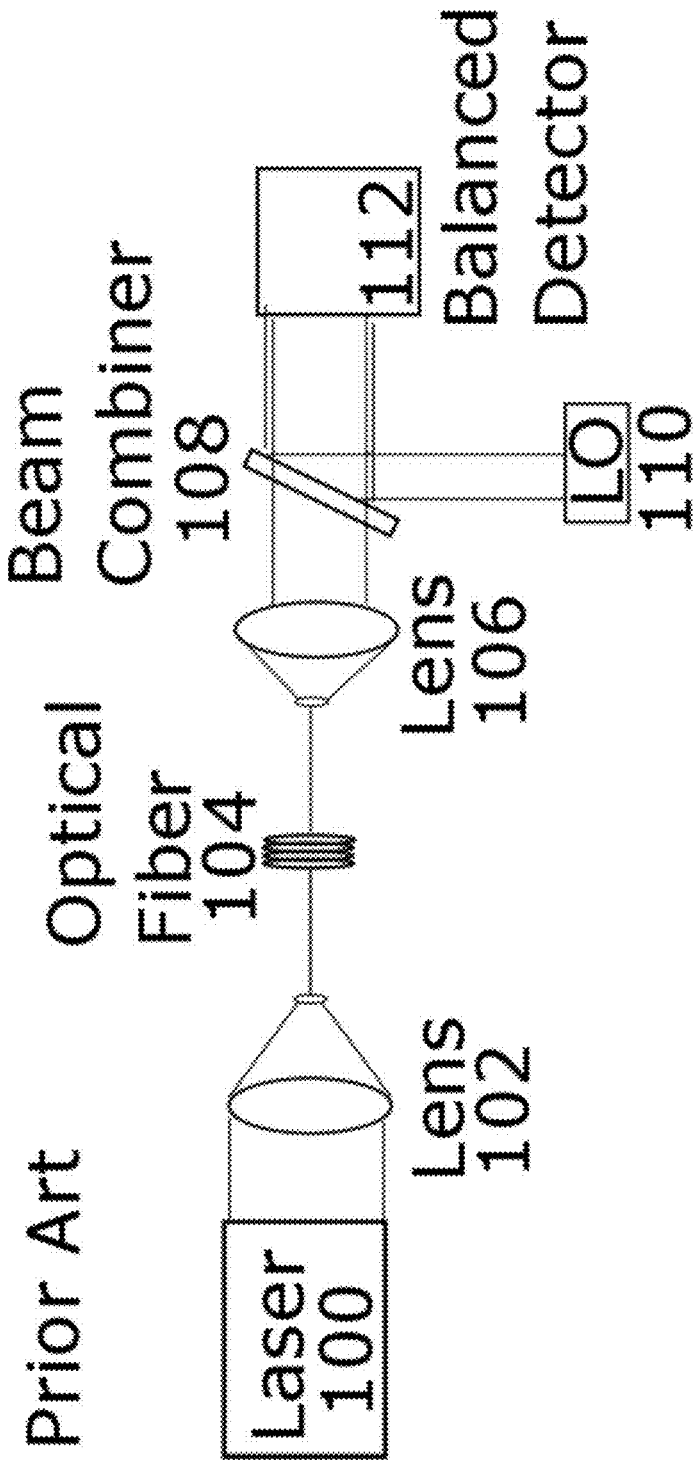
FIG. 1 illustrates a traditional FSO system according to the prior art.

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, for example, the singular forms "a," "an," "the" and the like include plural referents unless the context clearly dictates otherwise. Also, for example, reference may be made herein to quantitative measures, values, relationships or the like. Unless otherwise stated, any one or more if not all of these may be absolute or approximate to account for acceptable variations that may occur, such as those due to engineering tolerances or the like.

Overview of Coherent Detection

Coherent transmission and detection including homodyne and heterodyne detection has been well known and used in the fiber optic communications field since the first development of the single mode fiber. It is one of the core technologies that has enabled per fiber capacity to reach 100 terabits per second (Tbps) or higher. Coherent technologies allow data to be encoded in phase and frequency in addition to amplitude. Phase changes can be encoded at much higher data rates compared to amplitude-based encoding schemes due to the fact that modulating the phase of a laser may be faster than turning that laser on and off, such as in on-off keying.

Most coherent communication systems are self-referenced, meaning a single oscillator laser is split into two paths, one or both paths are independently manipulated to encode information and then the light is recombined, passed through the transmission chain and then incident on one or more detectors. These two streams of photons will interfere with each other and create temporal fringes as long as they are close enough in mode for the detector to see the fringes. By mode we mean the frequency, phase, polarization and direction of the photon streams. The sum of the signals on the detector have a constant part due to the sum of the intensities of the waves and a mixed amplitude part that oscillates at the beat note (difference) frequency between the two waves. Data encoded in the phase or frequency is encoded and read out as changes in this beat note/difference frequency. This technique is called homodyne detection since it originates from a single laser at a single frequency. These systems are essentially single mode (transversely) throughout the entire light path which simplifies the design and construction of interferometers and coherent detection.

There is no requirement that the two photon streams come from the same source however, the setup is simplified if they are in the same spatial mode and have same phase. One can interfere two beams from different lasers on a single detector provided that the frequency difference between the two lasers is less than the bandwidth of the detector and the two lasers spatially overlap on the detector so that the fringe spacing is larger than the detector (assuming lasers each have a single spatial mode). This applies to any number of lasers, with the number of possible beat frequencies increasing with the number of distinct wavelengths.

Many technologies can be used to modulate phase and/or frequency, among the most prevalent for fiber optic communications are lithium niobate modulators. These can be used as stand-alone phase modulators or in conjunction with an interferometer to generate amplitude modulated signals on different optical paths. The use of stimulated amplifiers, such as EDFAs and Raman, allow increased distances while maintaining the phase relationship of the photons.

Traditional FSO systems have used coherent detection in a similar manner. Both homodyne and heterodyne implementation will couple the free space photons back into a single mode transmission line, typically a fiber optic cable or waveguide. An example of such a system is shown in FIG. 1. Light from a laser 100 is coupled via a lens 102 or lens system into an optical fiber 104 on the transmitter side. The light travels through the fiber 104 towards the receiver end where a lens 106 couples the light back out of the fiber 104 and into free space. The beam is incident on a beam combiner 108, which can be a beamsplitter, polarizing beamsplitter, or a hot/cold mirror. Light from the local oscillator (LO) 110 is also incident on the beam combiner 108 and mixed on the balanced detector 112. This is a difficult process with resulting low efficiency, very tight alignment tolerances, and minimal passive optical gain (from say a lens or mirror). Any increase in the aperture by use of a lens or other optics means a corresponding decrease in the acceptance angle. This has been acceptable for FSO systems with high precision (and high cost) pointing and tracking systems.

Overview

Example implementations of this disclosure are directed to coherent detection in a receiver which overcomes these issues to enable the advantages of coherent detection with a large receive aperture and wide acceptance angular range.

The receiver may include a local oscillator at the detector along with a detector array where the individual elements are small enough to allow interference between the two light beams and can be summed and/or differenced to a set of receive electronics that are fast enough to cover the frequency difference between the local oscillator and the incoming light and capture the encoded information. The encoded information is captured when the phase or frequency of the incoming light changes, and changes the spatial interference pattern across the detector array.

The transmitter may include a light source that is modulated to encode data. Modulation may be phase modulation, frequency modulation, or other modulation techniques.

This architecture may work for any system that needs to capture light from a light source that meets the requirements for coherence and/or interferometry. This may include but not be limited to communications systems, LIDAR, and imaging systems. Example implementations provide a method for high data transfer rate using spatial coherent detection on a receiver array and can be advantageous in many systems needing a high data transfer rate.

In this disclosure we will describe in detail three systems that may benefit from example implementations of the present disclosure: (1) FSO communications over long distances, 10 m to 1000's of km, (2) short range FSO or DBFSO systems, operating over a few cm's to 1000 m, and (3) LIDAR systems over any range. To be clear, various implementations will work for FSO (free space optics) and DBFSO (diverged beam free space optics) communications links and systems. It will also work for remote sensing applications such as LIDAR and others.

Implementation Description

In one implementation, the receiver will have a laser, which will be referred to as the local oscillator (LO) and will mix the LO with light received (RL) from the transmitter onto a detector array. The LO and RL will spatially interfere and form interferences fringes across the detector array that are dependent on their relative angle.

Figure 2A:
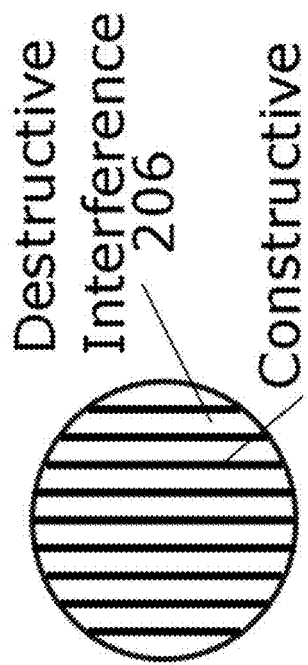
FIGS. 2A, 2B and 2C illustrate shows a depiction of the interference phenomena and a detector array, according to various example implementations of the present disclosure.
Figure 2B:
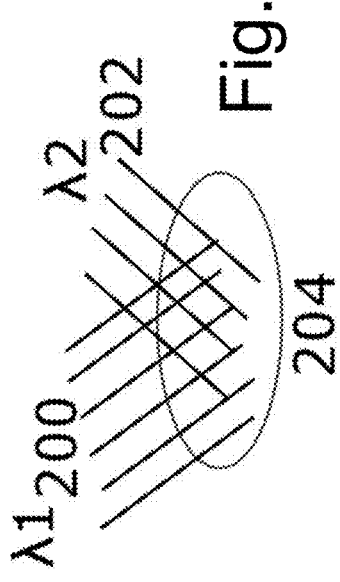
Figure 2C:
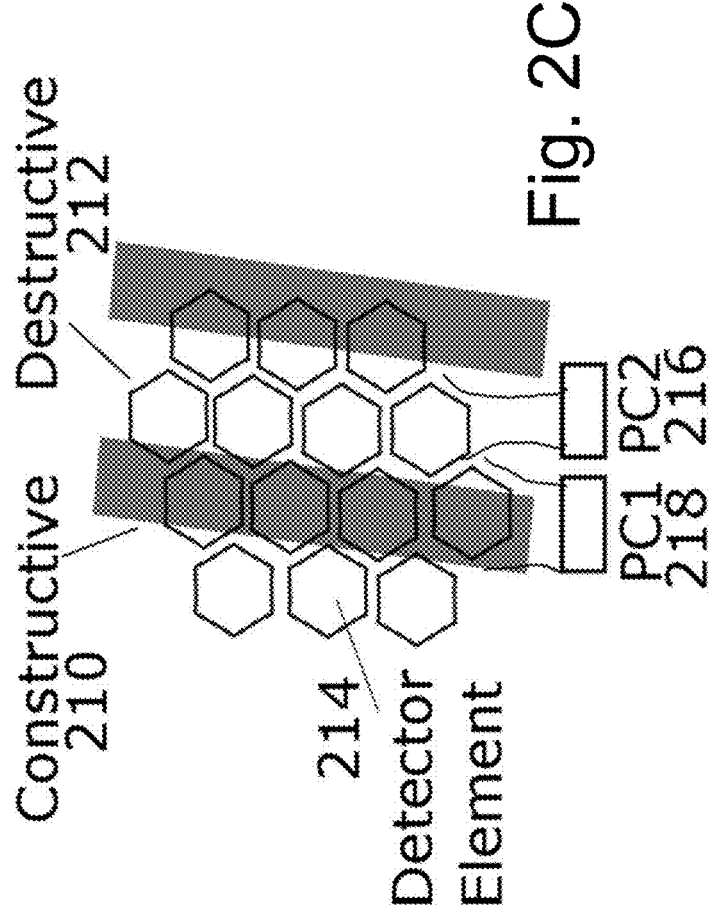

FIGS. 2A, 2B and 2C show a depiction of the interference phenomena and the detector array. FIG. 2A shows two beams of light, one with wavelength $\lambda 1$ 200 and the other with wavelength $\lambda 2$ 202. These two beams are incident on the detector or detector element 204 at different angles.

When this occurs, spatial interference between the two plane waves occurs as is shown in FIG. 2B. The spatial interference of the two plane waves creates areas of destructive interference 206 where there is no, less, or very little light (or signal) and places of constructive interference, where there is maximum light (or signal). These spatial interference fringes will have a fringe spacing that is determined by their relative angle and their respective wavelengths. Therefore, the number and location of the bright and dark fringes are a function of the frequency or phase difference of the LO and RL. If the RL is oscillating in phase, this will result in the fringes moving spatially across the detector, which can be read out by the detector array described in detail below.

The detector array shown in FIG. 2C will include multiple detector elements 214 where each detector element (DE) 214 may be less than half the size of the fringe 210, 212 generated by the LO and the RL. Here, the constructive fringes 210 are shown by the dark lines and the destructive fringes 212 are the spaces in between. If the elements 214 are less than half the size of the fringes 210, 212, as the fringes change location and they walk off one column of elements 214, that there are enough columns of elements 214 to capture the information in the summing circuits described below. Each detector element 214 will need to have a bandwidth that encompasses the frequency difference between the LO and the RL and the additional bandwidth needed encoding the data. The detector does not necessarily need to be sensitive to DC or low frequency signals, although it may be.

The elements may need to be smaller than half of the width of the fringes in order to capture the shifting of the phase of the RL. Typically they would be roughly ¼-½ of the width of the fringes, however they may be much smaller. Having much smaller detector elements then needed could potentially increase the statistics on the incoming data since many detector elements would read the same phase changes. Additionally, the proposed system could accept two different signals on the same receiver using the same LO. If there were two RL beams, each of the fringes could either be on different locations of the receiver or they could overlap with each other. In the latter case, a higher detector element density, and thus smaller detector elements, would be needed for resolving the two different signals. If the detector elements are larger than half the width of the fringes, the system will still work but the fringe contrast and hence the signal strength will be reduced.

The DEs 214 may be configured to each feed a receive circuit which may include a transimpedence amplifier and other electronics and/or signal processing. We will call each of these receive circuits a processing circuit (PC) 216, 218. This configuration may include many high speed PCs 216, 218 to process the data from the DEs 214. There may be configurations where a subset of the DEs 214 are processed.

Each PC 216, 218 will have summation stage that can sum up to all DEs 214. For a given orientation and frequency separation of the LO and RL, there will be a fringe 210, 212 across the detector array with some periodicity and orientation. Consider a snapshot of the fringe 210, 212 a point in time—all of the DEs 214 with the bright part of the fringe (constructive interference depicted with dark lines in FIG. 2C) 210 will be summed to PC1 218 and all of the DEs 214 with the dark fringes 212 will be summed to PC2 216. The outputs of PC2 216 can be subtracted from PC1 218 to give the fringe contrast. If the LO and RL have different frequencies, the fringes will move across the detector array and the subtracted output will oscillate at the frequency difference between the LO and RL. If the RL is now phase modulated (i.e., bits are encoded in the phase of the received light), this can be measured by using the frequency difference as well.

Another implementation uses a switch fabric between the DEs and the PCs. There may be a summation stage in front of some or all of the PCs. The switch fabric can be reconfigured to couple DEs to different PCs. As one example each DE could have a 1×2 switch so that the DE can go to PC1 or PC2. The switch fabric may be used for correcting for slow drift in the phase of the local oscillator or the spatial mode of the incoming light. Readout of the phase data is contingent on the spatial interference fringes maintaining coherence over some time so that only the phase changes in the RL cause the fringes to move. Other occurrences may also cause the spatial interference fringes to move across the detector such as drift in frequency of the local oscillator or changes in the spatial mode of the received light due to atmospheric turbulence and scintillation. These changes are on a much slower time scale than the phase changes that carry the data in the RL however they cannot be ignored. The switching fabric allows for the pixels to be remapped or reprogrammed, giving the detector array some "intelligence" in order to counteract the slow drift changes that occur.

Figure 3:
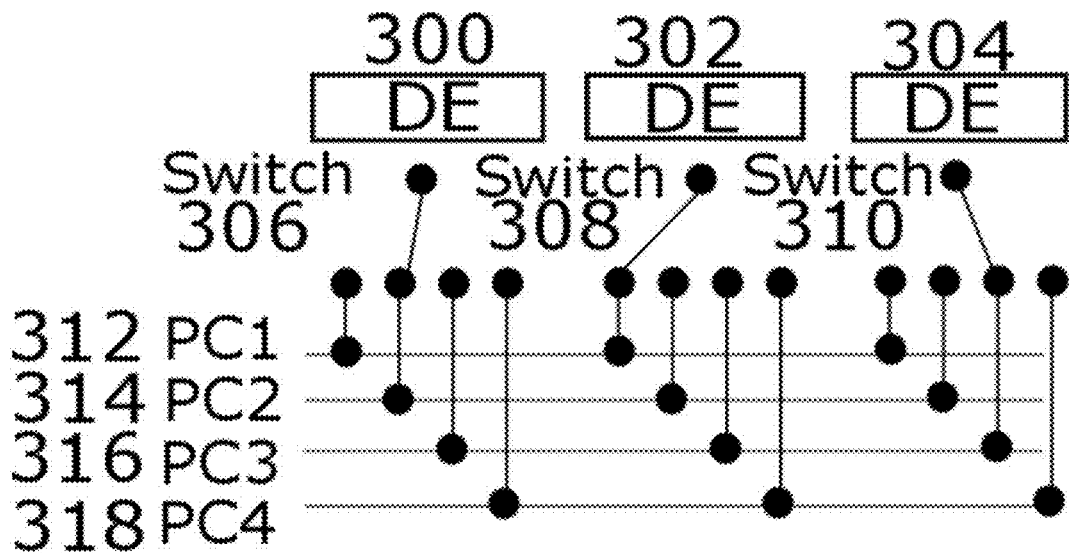
FIG. 3 illustrates switches programmable to couple detector elements to processing circuits, according to various example implementations.

Another case will have a 1×4 switch on each DE leading to PC1, PC2, PC3, and PC4. This is shown in FIG. 3. Three DE elements 300, 302, 304 each have an associated switch 306, 308, 310 respectively that lead to one of four PCs, PC1 312, PC2, 314, PC3 316 or PC4 318. In one configuration the switches will be configured so that the relative fringe spacing between each of these is ¼ of a fringe or 90 degrees—i.e., if PC1 312 is set to be 0, then PC2 314 will be at 90 degrees, PC3 316 is at 180 degrees, and PC4 318 is at 270 degrees. The overall phase may then be calculated by:

$$\text{phase} = \frac{PC3 - PC1}{PC2 + PC4}$$

The number of DEs may range from 2 to billions. In more particular examples, the number of DEs may be greater than 100 thousand, 1 million, 10 million, 100 million, or 1 billion. The number of PCs may range from two to millions. The switches may connect a DE to two or more PCs up to the total number of PCs.

As noted before, it is possible to detect multiple sources of RL using one or more LOs and multiple sets of PCs. Smaller DEs may make this easier. For example, the system may detect two RLs coming from different angles by using 4 PCs with each one connected to a set of DEs. One set of DEs may be aligned with the constructive fringes of RL1, one set of DE's may be aligned with the destructive fringes of RL1, one set of DE's may be aligned with the constructive fringes of RL2 and one set of DE's may be aligned with the destructive fringes of RL2. From there, standard signal processing would generate the data from RL1 and the data from RL2. This can be expanded to many RLs and LOs as needed or is practical.

The detector arrays may be thought of as the area scan arrays that are used in cameras, but where the output of the entire array is a 0 or 1. This compares to the megabytes or gigabytes of data that may be generated by one frame capture of a large array with 6 to 12 bits of digitization depth for up to 3 colors. The "frame" rate is now extremely fast, megabits to many gigabits as compared to a camera. The total data generated may be of a similar order of magnitude, but is now communications or sensing data instead of imaging data.

The fringe spacing dictates the minimum pixel size and spacing and is calculated the following way. We assume two plane waves with the standard form, $$\vec{E_1} = E_{1_0} e^{i(\omega_1 t - \vec{k_1} \cdot \vec{r})}$$

$$\vec{E_2} = E_{2_0} e^{i(\omega_2 t - \vec{k_2} \cdot \vec{r})}$$

where $E_{1,2_0}$ are the amplitudes of the two plane waves, $\omega$ is the frequency of the light, and $\vec{k}_{1,2}$ is the wavevector associated with the plane wave with magnitude $$k_n = \frac{2\pi}{\lambda_n}.$$

When the two plane waves interference on a screen or detector, we calculate the intensity from the product of the sum of their fields such that:

$$I = |<\vec{E}\vec{E}^*>|$$

where $\vec{E} = \vec{E_1} + \vec{E_2}$. Assuming $E_{1_0} = E_{1_0}^*$ and $E_{2_0} = E_{2_0}^*$ and using Euler's formula, $e^{i\phi} = \cos(\phi) + i\sin(\phi)$ the intensity is given by, $$I = |E_{1_0}|^2 + |E_{2_0}|^2 + E_{1_0}^* E_{2_0}[(\cos[(\omega_1 - \omega_2)t] + i\sin[(\omega_1 - \omega_2)t])(\cos[(\vec{k_2} - \vec{k_1}) \cdot \vec{r}] + i\sin[(\vec{k_2} - \vec{k_1}) \cdot \vec{r}])] + [(\cos[(\omega_2 - \omega_1)t] + i\sin[(\omega_2 - \omega_1)t])(\cos[(\vec{k_1} - \vec{k_2}) \cdot \vec{r}] + i\sin[(\vec{k_1} - \vec{k_2}) \cdot \vec{r}])]$$

Using the symmetry properties of sines and cosines this reduces to, $$I = |E_{1_0}|^2 + |E_{2_0}|^2 + 2E_{1_0}E_{2_0}(\cos[(\omega_1 - \omega_2)t]\cos[(\vec{k_2} - \vec{k_1}) \cdot \vec{r}] - \sin[(\omega_1 - \omega_2)t]\sin[(\vec{k_2} - \vec{k_1}) \cdot \vec{r}])$$

If $\omega_1 = \omega_2$ we recover the standard single frequency result or if $t = 0$ we recover the same stationary fringe result as is given in the literature if the field amplitudes are equal—

$$I \propto \cos^2(kx \sin \alpha)$$

for interference fringes spaced along the x-direction. Here, $\alpha$ is the angle of the plane waves with respect to the screen or detector's normal vector. The spacing is periodic and based on the frequencies of the light and the angle between the plane waves.

The plane wave approximation is a valid one for the case described because even in a DBFSO system, the divergence angle is negligible over the aperture of the receiver. Essentially, the size of the beam at the receiver compared to the size of the receiver is very large so that the slight curvature of the wavefront due to the divergence is negligible over the area of the receiver and can be well-approximated with a plane wave.

Noise Calculations

For direct detection systems, specifically with on-off-keying modulation such as our previously proposed DBFSO system, the dominant sources of noise are shot noise, and thermal/Johnson noise. Both signal and ambient light as well as dark current in the detector contribute to the overall shot noise of the system. For larger receiver acceptance and divergence angles, the shot noise is dominated by the ambient light, even with aggressive optical filtering. For DBFSO systems with narrower beams, the signal shot noise dominates, specifically at close ranges and higher signal powers. Link margin for the system is calculated using the Bit Error Rate (BER) and the signal-to-noise ratio (SNR).

Figure 4:
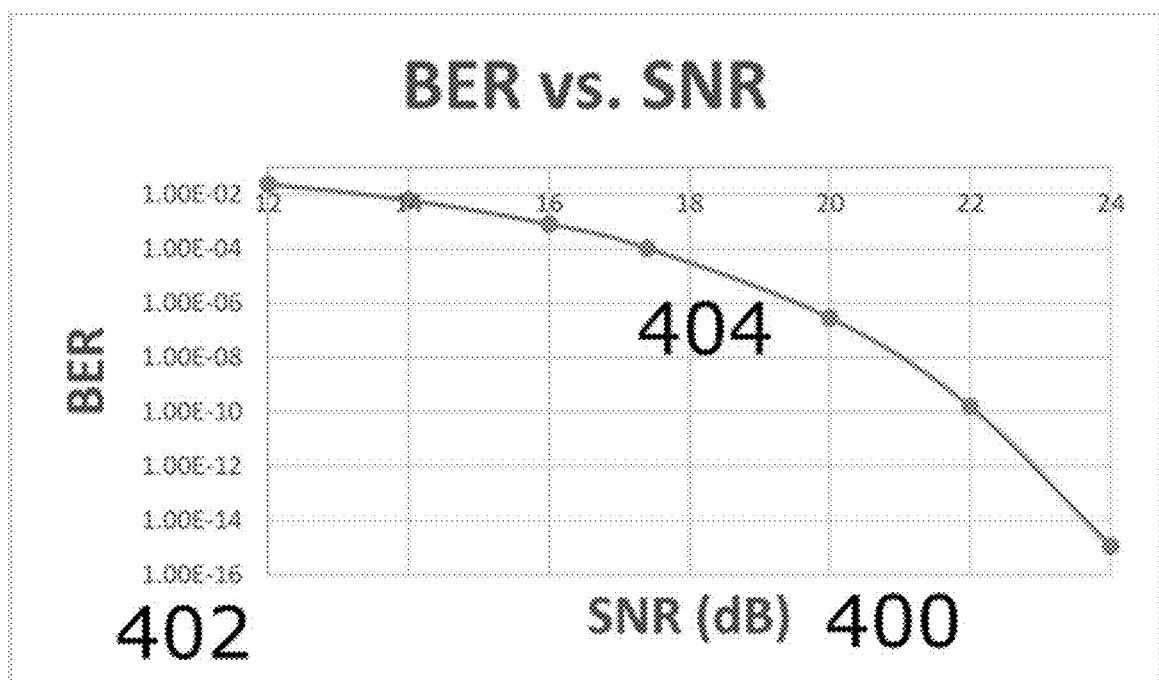
FIG. 4 shows a curve of the signal-to-noise ratio (SNR) versus bit error rate (BER) for an on-off keying (OOK), return-to-zero system, according to various example implementations.

Using forward error correction (FEC), it is possible then to correct for bit errors in each frame up to a theoretical maximum for the particular FEC scheme. The SNR is correlated with the BER—the higher the SNR, the better the BER. FIG. 4 shows a curve of the SNR vs. BER for a OOK return-to-zero system. The BER is plotted on the y-axis 402 and ranges from 1e-2 (i.e., $1\times10^{-2}$) to 1e-16 (i.e., $1\times10^{-16}$). It is plotted versus the SNR in dB on the x-axis 400. The curve is denoted by 404. Here, the link margin for a BER of $10^{-4}$ is roughly 17 dB.

The signal to noise for an OOK system using an APD is given by:

$$SNR = \frac{(M\Re P_s)^2}{2qM^2 F_A(\Re P_s + \Re P_a + I_d)\Delta f + \frac{4k_B T}{R_L} F_N \Delta f}$$

where M is the APD gain, $\Re$ is the APD responsivity, $P_s$ is the signal power, $P_a$ is the ambient power, $F_A$, is the detector noise figure, $I_d$ is the dark current in the detector, $R_L$ is the resistance in the amplifier, T is the temperature, $F_N$ is the amplifier noise, $k_B$ is Boltzmann's constant, q is the fundamental electron charge, and $\Delta f$ is the bandwidth. The first term in the denominator is the contribution from the shot noise while the second term is the Johnson noise of the transimpedance amplifier. The shot noise has contributions from the signal itself, from the background ambient light, and from the dark current in the detector. Most direct detection systems are shot noise limited, and include a certain amount of power in the signal beam to overcome the shot noise floor from the signal and ambient light combined.

The noise in a coherent detection system has an additional contribution from the LO shot noise as well as the signal. Due to the fact that the measured signal in a coherent detection system is the combined (multiplied) fields of the input signal and the LO, the system has a higher sensitivity and has a lower power threshold for the signal. The SNR for a coherent detection system is given by:

$$SNR_C = \frac{2\eta(M\Re P_s)*(M\Re P_{LO})}{2qM^2 F_A(\Re P_s + \Re P_a + I_d + \Re P_{LO})\Delta f + \frac{4k_B T}{R_L} F_N \Delta f}$$

where $P_{LO}$ is the power in the LO and $\eta$ is the "mixing efficiency" of the signal and LO and calculated with an overlap integral of the two beams and ranges from 0 to 1. For strong LO beams the LO shot noise dominates and the Johnson noise, and shot noise from the signal light, ambient light and the dark current all become negligible. In this case, the SNR reduces to:

$$SNR_{LO \gg S} = \frac{2\eta(M\Re P_s)}{2qF_A \Delta f}$$

where the SNR depends dominantly on the power in the signal. If $\eta$ is approximately 1, this SNR is a factor of 2 higher than the direct detection case for the shot noise limit.

This analysis supports two benefits of example implementations of the present disclosure—(1) the use of an LO increases the upper limit of system SNR by a factor of two compared to incoherent detection systems, and (2) using an LO can obviate the shot noise contribution from ambient light thus reducing the system sensitivity to ambient light.

In some implementations, the optical filtering specifications to reduce the ambient light can be reduced. This may increase the filter bandwidth, which typically reduces the filter cost. For large aperture receivers this can be significant. In other implementations, the optical filter may be removed entirely. In some cases, the reduction in filter cost may compensate for or outweigh entirely the additional costs due to the LO.

Transmitters

Example implementations may include transmitters that are coherent in some degree of freedom that can encode information that can be received and processed by the receivers described herein. A variety of modulation schemes may be used. These include, but are not limited to phase and frequency modulation, polarization, and spatial mode.

Transmitters may be based on various light generation technologies. One such technology is telecom optical components in the 1300 to 1600 nm wavelength range. Transmitters may be built out of fiber coupled components or free space components. Phase modulation may be done with lithium niobate modulators or other modulators. Amplitude modulation may also be done with lithium niobate modulators combined with an interferometer or other implementations. One example of fiber-based transmitters is shown in FIG. 5C. Here, a laser 504 is modulated by a modulator 506 and amplified by an EDFA 508 before being coupled into an optical fiber 510.

Figure 5A:
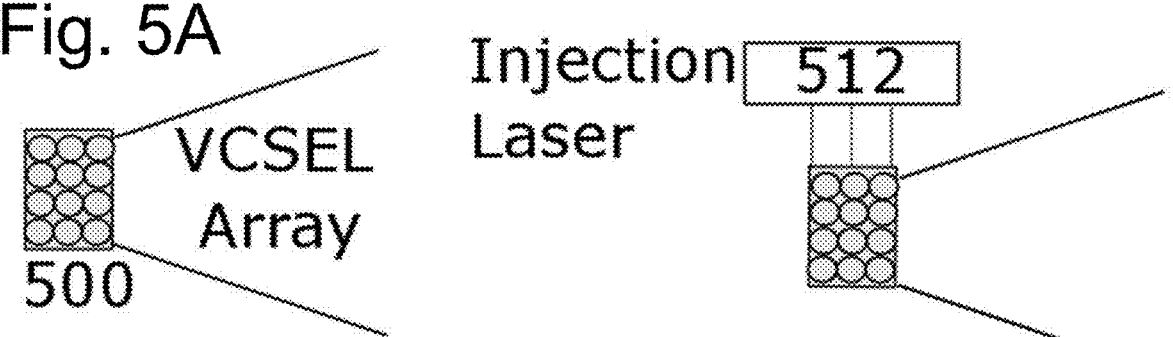
FIGS. 5A, 5B and 5C illustrate transmitter technologies according to various example implementations.

Another transmitter technology used in a variety of high speed applications is vertical surface cavity emitting laser (VCSELs) arrays depicted in FIG. 5A. These are similar to those used in current implementations of the DBFSO systems. VCSEL arrays 500 used to date have had hundreds of elements, but no coherence between elements. Modulation has been done by turning the current to the VCSEL arrays 500 on and off which is an amplitude modulation scheme called on-off keying (OOK). Phase locked VCSEL arrays may be locked by an injection laser 512 and have already been demonstrated in the literature. The phase-locking for a few VCSELs in an array has been demonstrated, and this technology should scale to thousands of VCSEL elements and many Watts of transmitter optical launch power. The phase-locking of the elements together can be done with distributed Bragg Gratings (DBGs) or patterned tunnel junctions as described in the publication. However, control of the phase of the elements is needed to transmit data. Work has been done on injection locking of VCSEL arrays wherein multiple VCSEL elements are injection locked to an external laser that is fed into the array. The phase locked array can then be used to phase-lock a second array to the first array. This work was done with the goal of creating a controllable optical phased-array with VCSELs. Phase-controllable VCSEL arrays may then be fabricated and controlled using a phase-stable injection seed laser. The optical phase can theoretically be modulated as quickly as the seed laser's phase due to the small cavity lengths of the VCSELs.

Another potential solution to increase the power in a single mode VCSEL is by amplification of the emitted light. In standard telecom fiber communications systems, an EDFA (erbium doped fiber amplifier) is used to amplify the signal before it is sent through the fiber. An alternative implementation is to use a vertical cavity semiconductor optical amplifier (VCSOA). These devices have a small form factor and low cost and are very similar to VCSELs in fabrication. The main difference between a VCSEL and VCSOA is that the VCSOAs are constructed in such a way that the feedback is much lower. VCSELs maximize the feedback in the cavity to achieve lasing at lower input thresholds while VCSOAs minimize the feedback so they can achieve gain through the medium without reaching the lasing limit. Gains of up to 24 dB can be achieved in a VCSOA and it may be possible to integrate these amplifiers directly with the VCSEL structures into a single device. In some implementations, a phase control element may be integrated with the VSCEL and VCSOA. In some implementations, the stack up may be a VCSEL followed by a phase control element followed by a VCSOA.

Figure 5B:
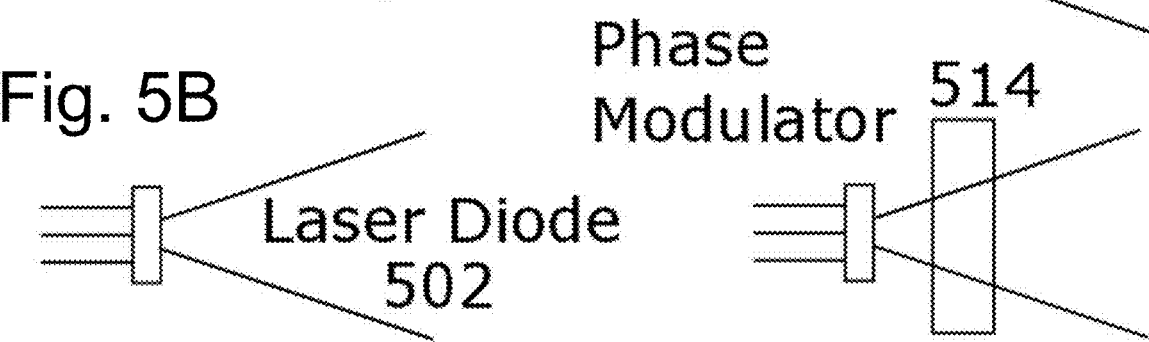
Figure 5C:
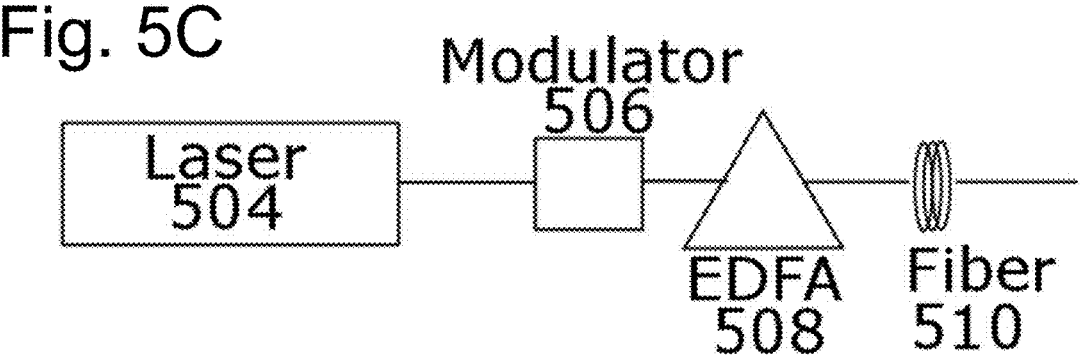

Another transmitter technology used in communications systems are diodes including single emitting diodes, such as shown in FIG. 5B. Laser diodes 502 can be directly modulated. In other implementations, laser diodes can be coherent and phase-stabilized and phase modulated 514 with a separate modulator. Previously these were not considered in the DBFSO work because of their slower response times to modulated current (i.e., the on/off speeds are orders of magnitude lower than the short-cavity based speeds of the VCSELs) however, amplitude modulation speed does not dictate phase-modulation speed, so these devices could also be used as the transmitters for the coherent detection system.

Another transmitter technology that may be used is the fiber optic implementation using a laser 504, with a modulator 506, and an EDFA 508. Many implantations are available with a range of wavelengths, modulation techniques, data bandwidths and output powers.

These implementations may provide two advantages compared to previous DBFSO or FSO systems—(1) higher launch powers and (2) higher data rates. As has been learned in the fiber optic communications field, it is easier to phase modulate lasers than to amplitude modulation them. This is particularly true as the systems go to higher launch powers and higher data rates. This holds true for the FSO and DBFSO systems as well.

Coherent Receiver

The LO will need to be close enough in wavelength (frequency) and have sufficient phase stability to allow detection of fringes and the encoded data. The LO may be tunable, either in frequency and/or phase. There may be one or more feedback loops (feedback circuits) to set the LO frequency and/or phase. The data can be transmitted at frequencies ranging from the maximum frequency of the detector array elements and DEs down to DC. In some cases, there will be a lower bound on the frequency used for the data. Frequencies below that can then be used by the feedback loops for the LO. That is there can be low speed drift in frequency and/or phase of the LO that will not affect reception of that data.

Figure 6A:
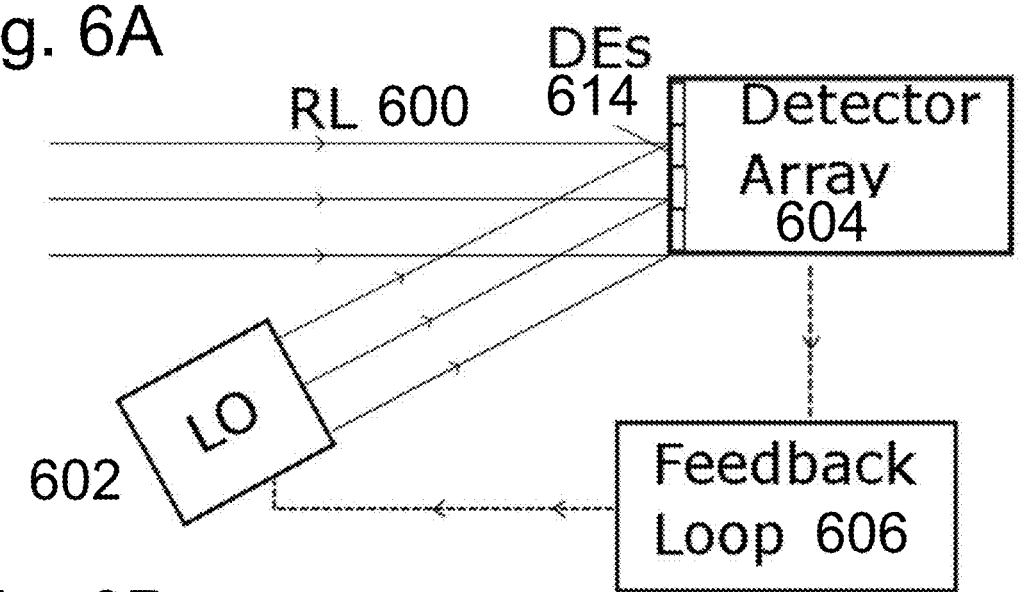
FIGS. 6A and 6B illustrate examples of a feedback loop, according to various example implementations.
Figure 6B:
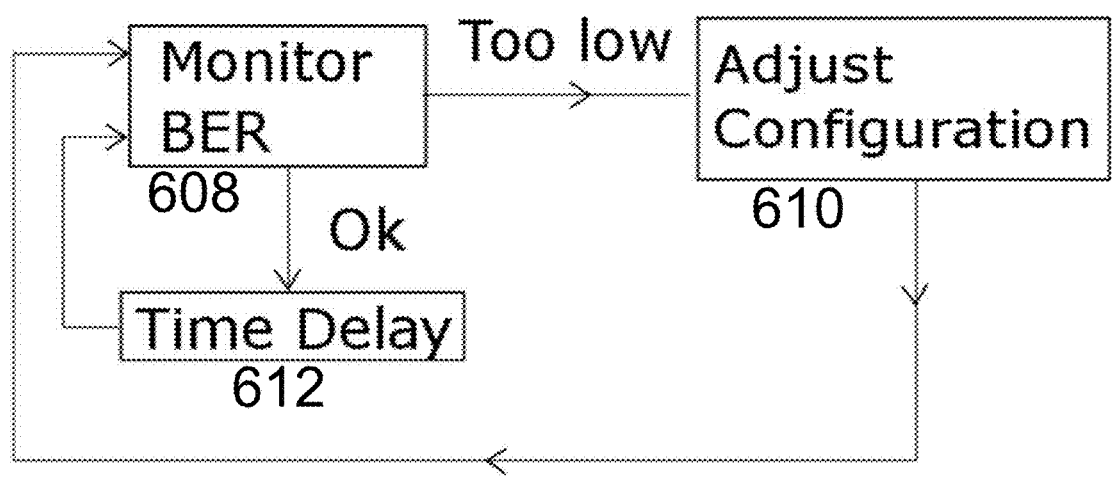

An example of a simple feedback loop (feedback circuit) is shown in FIG. 6A. In FIG. 6A, the RL 600 enters the detector array 604. The detector array 604 has a wide variety of parameters it can measure, and based on one or more of those parameters it sends feedback via a feedback loop 606 to the LO 602 which can then be adjusted to optimize a given or chosen parameter. One example of this is shown in FIG. 6B where the detector monitors a bit error rate (BER) 608. If the BER is in an acceptable range, the detector elements 604 stay as they are until a set time passes given by the time delay 612, before the BER is measured again. If the BER is too high, part of the feedback loop is set to adjust the configuration 610 at the detector array 604. This could be switching the PC of various detector elements for the array to increase the fringe contrast.

In some implementations, there may be one or more sections of the receiver that are specifically used for alignment. This is shown in FIG. 7A. This depicts the entire receiver being split into the data array sections 700, 702 and the alignment array sections 704, 706. In these sections there may be high speed readout capability for each detector element. The output can then be used to analyze the fringe pattern, including spacing and direction information. This information may then be used to reprogram the switch fabric. This reprogramming may then keep the detector readouts aligned with the fringes. This feedback loop may operate at any frequency from DC up to the readout rate of the alignment sections of the array.

In some implementations, it may be possible to readout some or all of the detector array in a similar fashion to a camera readout. This may allow the system to operate as a camera, particularly in cases where there are optics in front of the array. This readout mode may be used during initial alignment and setup, during times when the data signal has been lost, at routine intervals, or other times.

FIG. 7B shows a flow diagram for any of the example implementations where some or all of the array may be read out, as in a camera 708, the output may be spatially Fourier Transformed (FT) 710 to determine the direction of the RL relative to the LO. This information may be used to configure or reconfigure the switch settings on the DEs 712 before more data is acquired 714. A processor may be used for the FT and any other calculations or processing to configure the DEs.

Figures 8A, 8B:
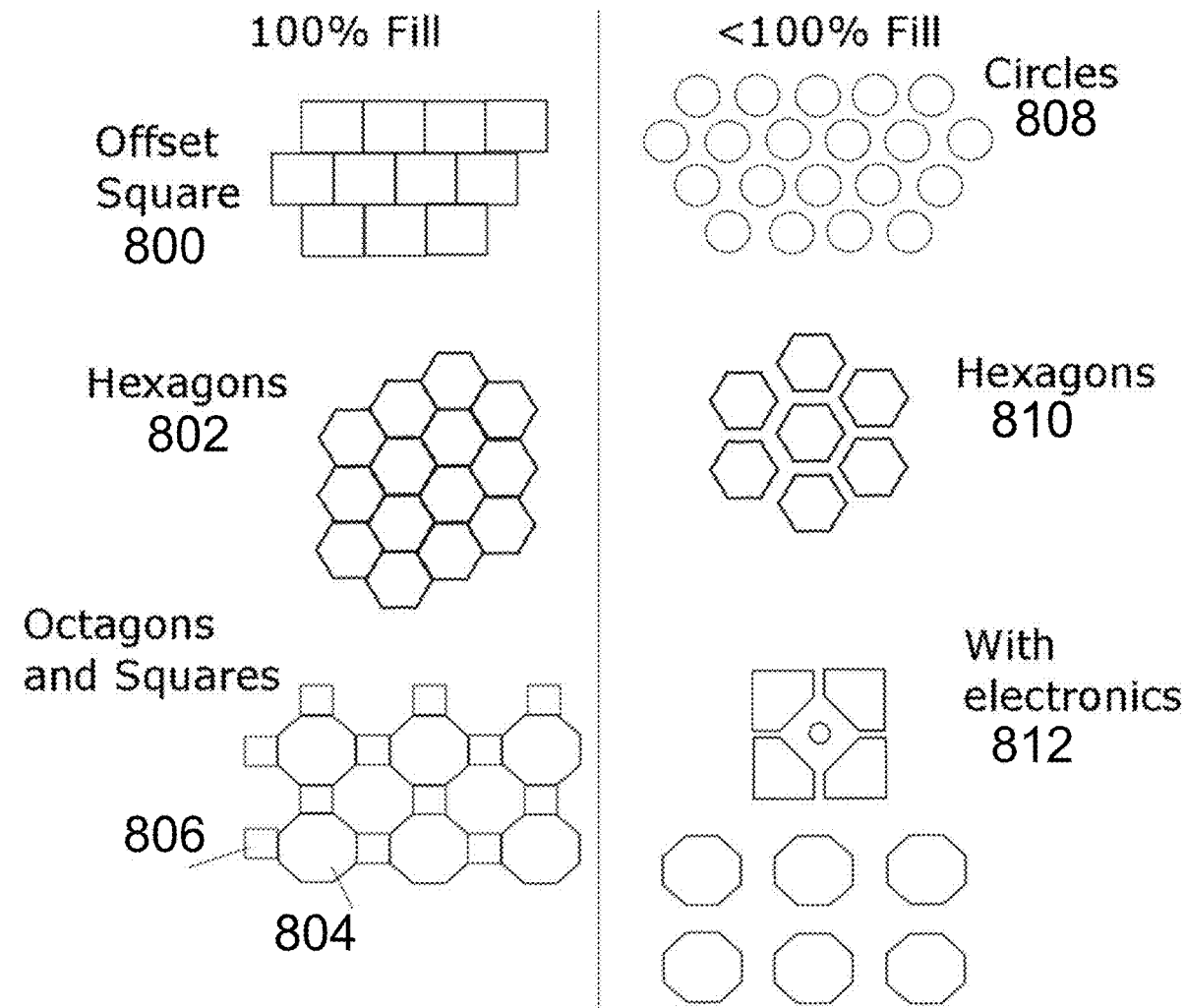
FIGS. 8A and 8B illustrate fill factors for arrangements of detector elements, according to various example implementations.

In some implementations, the fill factor may be 100% and the individual DEs may be square, rectangular, hexagonal, or any other shape that can result in 100% coverage as shown in FIG. 8A. Square elements 800 or hexagonal elements 802 can be used as single shape elements for the array. However, the DEs do not have to all have the same shape and any number of shapes may be used. For example, one can achieve 100% fill factor using a combination of octagons 804 and squares 806.

In other implementations, the fill factor may be less than 100% as shown in FIG. 8B. In these implementations, the DEs can take on any shape, including round 808, square, rectangular, hexagonal 810 and others. In some cases, a fill factor of less than 100% may be advantageous as it leaves space for other components, such as the switch fabric, or other capability. An example of this is where the elements are spaced such that associated electronics fit between them 812.

In some implementations, the detector arrays may be built on CMOS type technology. Each pixel (DE here) may have a set of transistors operable as switches to couple the given pixel (DE) to one or more PCs. This may increase the active area of the pixel as compared to a pixel in a CMOS camera array. As described previously the PCs may sum the output of multiple DEs and then subtract that from the sum of other DEs. The bit depth will now typically be 1 bit; although it may be up to any value, including the typical 8 to 12 bits for camera pixels.

In some implementations, the sum of a set of DEs may be compared to a reference voltage and then digitized into a 0 or 1 based on the comparison of the output voltage to the reference voltage.

In some implementations, the detector arrays may be built on CCD type technology. Here, the currents from one or more pixels (DEs) may be summed and then subtracted from the current summed from one or more other pixels (DEs). This result may then be digitized. Again, the bit depth may be 1 bit, resulting in a 0 or 1, or a higher bit depth. In other implementations, the summed current may be compared to a reference current and a 0 or 1 generated based on the amount of current relative to the reference current.

In other implementations, the physical materials may include InGaAs, InGaAs combined with CMOS and other materials.

Figure 9:
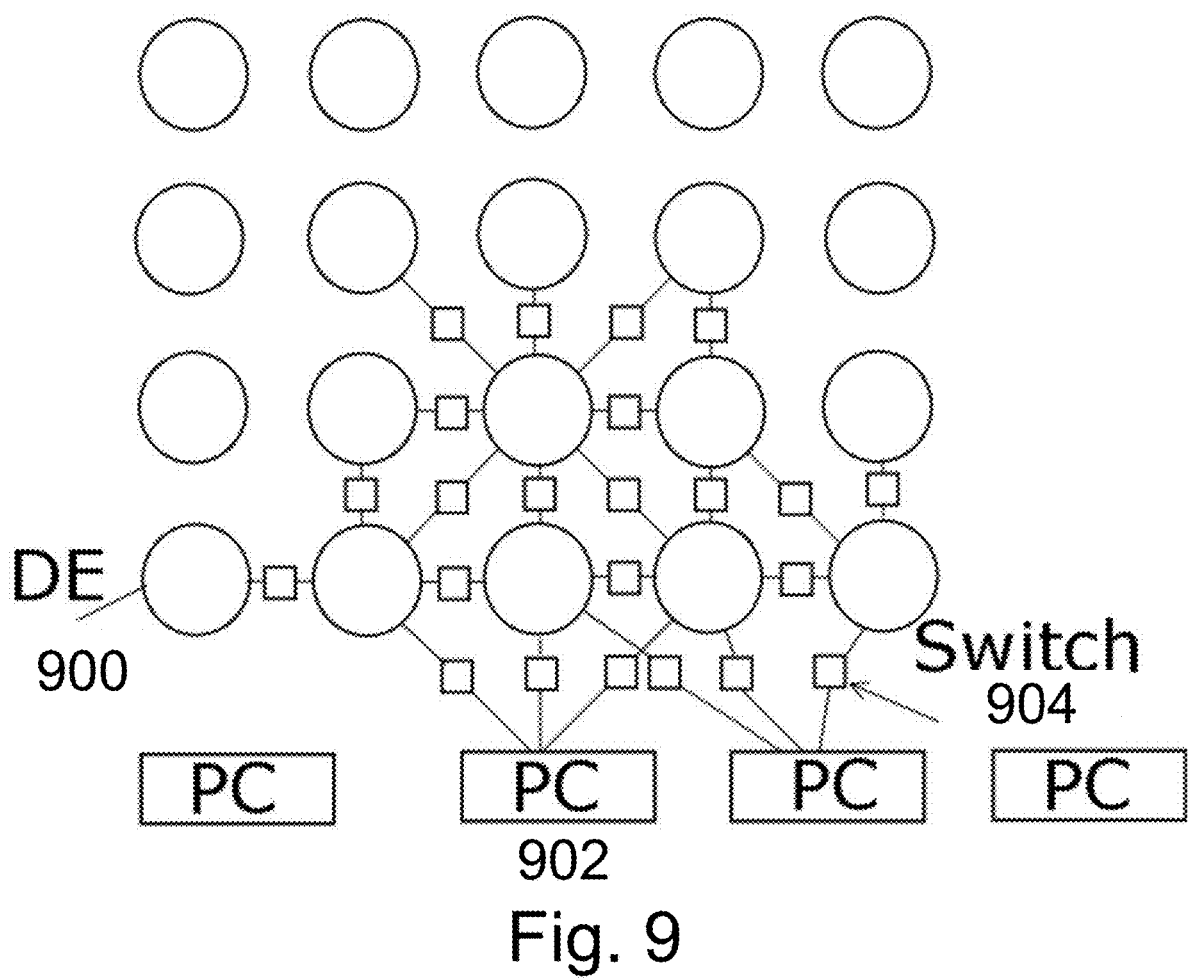
FIG. 9 illustrates detector elements connected to neighboring detector elements, according to various example implementations.

In some implementations, the DEs may be connected to one or more adjacent or otherwise neighboring detector elements. An example of this is shown in FIG. 9. Here, the DEs 900 are denoted by all the circles and the switches 904 by the smaller squares. In some cases, which elements they are connected to can be changed, perhaps at very high speed. Furthermore, in some of these implementations, some or all of the DEs at the edge of the array may be connected to PCs 902. In these configurations, the fringe pattern can be set in the DEs by connecting all of the DEs in a bright line, connecting all the DEs in the adjacent dark line, and repeating across the entire array. The various bright and dark lines may each have their own PC at the edge of the array or they may be summed and/or differenced at the edge of the array before going to a PC. This architecture may be constructed using CMOS, CCD or other material and process technologies.

In some implementations, the detector is made up of Silicon Photomultiplier cells (SiPMs). These detectors, frequently used in PET imaging and LIDAR applications and discussed in the prior art have thousands of microcells. Each microcell is a silicon avalanche photodiode device biased above the breakdown voltage (Geiger device). Each microcell may have a fast output for high timing precision of pulses or a slower output. The SiPM microcells are summed on the output of the photodiode both for the high-speed output and the cathode output. For use in coherent detection as outlined above, the SiPM may be split into different sections, with each section having a number of microcells and a switch or each microcell may have its own switch as proposed above for APD arrays. SiPMs have very high gain and very good timing resolution but suffer the drawbacks of being easily saturated and having long recovery times for each microcell.

In some implementations, the detectors are PIN photodiodes.

In some implementations, the detectors are APD arrays used in either Geiger or non-Geiger mode.

Quad detectors with lens—in some implementations, the detector array may include a quad detector, such as is used for pointing and tracking. That is, the detector array may include a quad detector configured to enable the optical receiver to track the external source from which light is received. An example of this is shown in FIGS. 10A-D. An example of a simple setup is shown in FIG. 10A where the RL 1000 and the LO 1002 are incident on the quad detector 1004 at different angles without being modified by any optics. The quad detectors 1010 are typically round and divided into 4 quadrants 1006 as shown in FIG. 10B. Each quadrant may be connected to a PC. Depending on the relative location of the LO and RL, there will always be at least two of the detectors that are capturing opposite parts of the fringe. In FIG. 10B the "bright" part of the fringe 1008 covers element 2 of the quad detector 1010 and parts of elements 1 and 3, but nothing of element 4. The size of the elements in the quad detector will set the maximum angular range between the LO and RL. The quad detector may be used in conjunction with one or more optical elements, including lenses and mirrors to provide optical gain as shown in FIG. 10C. Here, a lens 1012 focuses the RL 1016 onto the quad detector 1018. The LO 1014 does not get focused onto the quad detector 1018. The resulting fringes for this case are distorted as shown in FIG. 10D. This figure denotes one possible way the fringes 1024 could be distorted. Here the fringes 1024 are curved over the quad detector elements 1022, making the ratio of light and dark amounts on the same quad detector 1020 different. The optical gain from the lens may come at the expense of angular range on the detector and will be magnified on the lens (or mirror) thus reducing the maximum angle between the RL and LO. One advantage is that high-speed quad detectors are already commercially available.

Figure 11E:
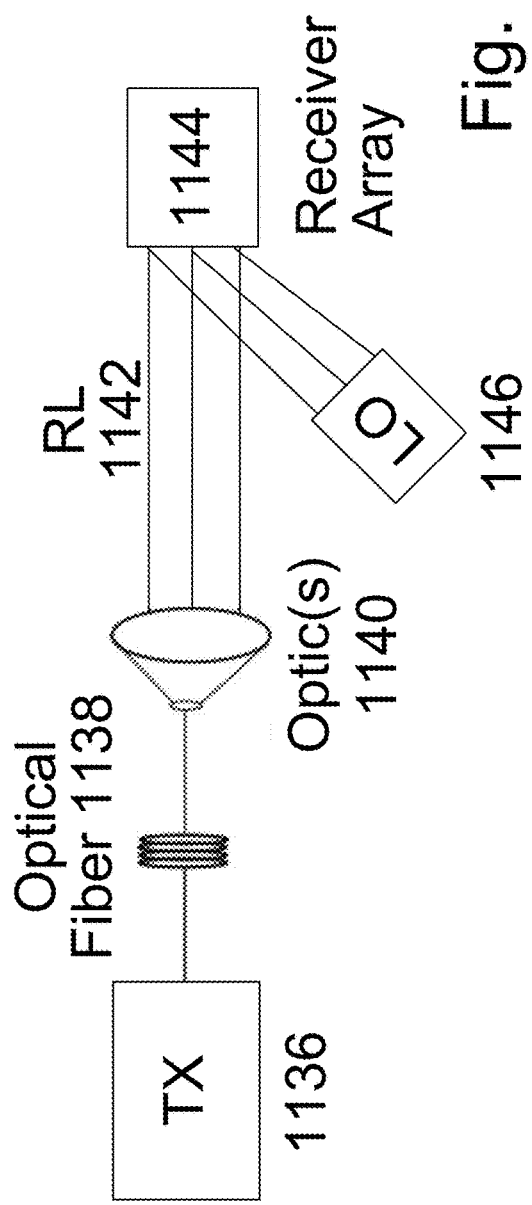

Receiver configurations—In some implementations, the receiver may not use any optics for either the RL or the LO, while other implementations may use a variety of optics. Several example configurations are shown in FIGS. 11A-F. Here, the transmitter 1100 has beam shaping optics such as a lens 1102 and is some distance away from the receiver. The receiver may have no optics, as in FIG. 11B where the RL 1104 and LO 1106 are directly mixed on the receiver array 1108. There may be optics that focus the RL such as shown in FIG. 11C where the RL 1112 is focused by a lens 1110 onto the receiver array where it is mixed directly with the LO 1114. There may also be a specific optic that does the mixing of the LO and RL such as shown in FIG. 11A. Here the RL 1120 is focused by a lens 1118 and mixes with the LO 1134 on a beam mixer 1122 such as a beamsplitter or hot/cold mirror before hitting the receiver array 1124.

Line scan arrays—In some implementations, a line array detector such as those commonly found in line-scanning cameras is used instead of a two dimensional detector array as shown in FIG. 11D. The RL 1130 and the LO 1128 light may be incident on a cylindrical lens 1126 which focuses the beams into a one-dimensional line 1132. The interference fringes are periodic across this line with the spacing dependent on the angle between the RL 1130 and LO 1128 and the respective wavelengths. Using a line array 1132 allows for fewer elements in the array as well as using current off the shelf, high-speed arrays.

Figure 11F:
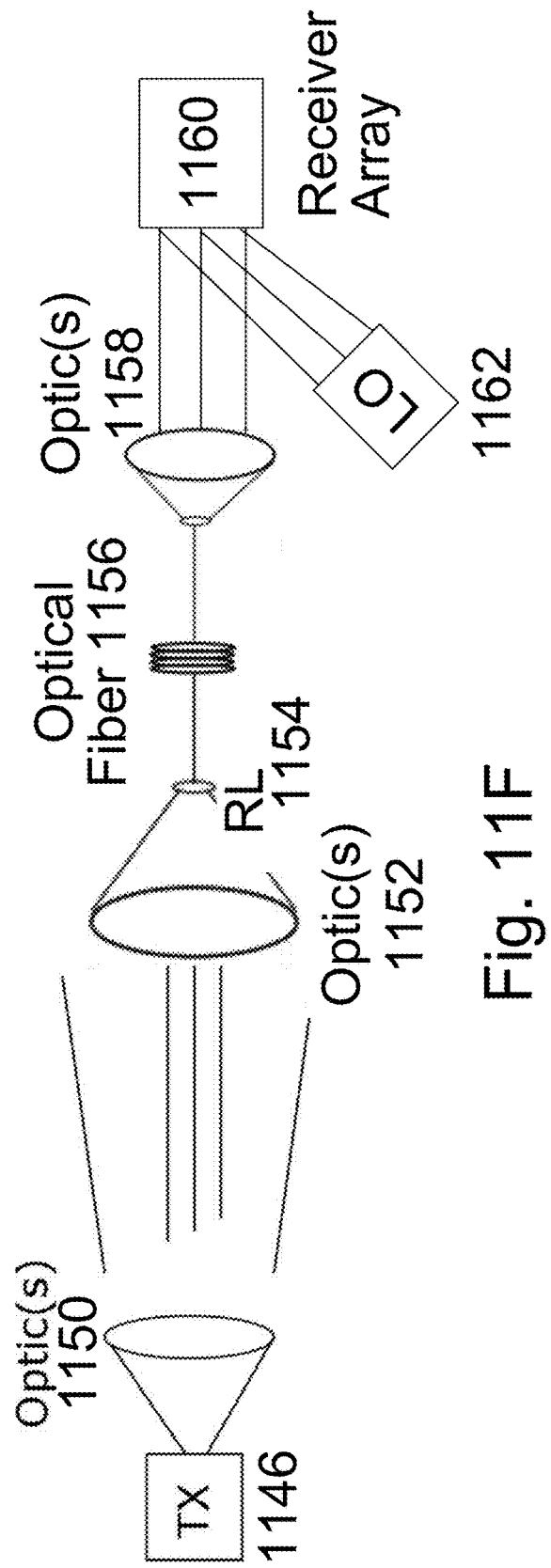

FIG. 11E and FIG. 11F illustrate further examples. In FIG. 11E, light from the transmitter 1136 is coupled into a multimode optical fiber 1138 on the transmitter side. The light travels through the fiber 1138 towards the receiver side where a lens 1140 couples the light (as RL 1142) back out of the fiber 1138, and onto the receiver array 1144 where it is mixed directly with the LO 1146. FIG. 11F illustrates an example in which light from a transmitter 1148 is collimated, focused, or diverged with a lens or optical system 1150 and travels through free-space to the receiver side at which at least some of the light is coupled via a lens 1152 or lens system (as RL 1154) into a multimode optical fiber 1156. On the receiver side, a lens 1158 couples the RL 1154 back out of the fiber 1156, and onto the receiver array 1160 where it is mixed directly with the LO 1162.

If a line array and cylindrical lens is used, care must be taken to have the RL and LO beams at a small enough relative angle to each other that they are not shifted off of each other by a large amount. If light is incident on a cylindrical lens, the lens focuses it to a line, but not an infinite line. The width of the line in a given plane is set by the dimension of the cylindrical lens and the focal length. If light it incident on a cylindrical lens at an angle, the line shifts along its longitudinal axes. Two beams could be made to not overlap if they are incident on the same cylindrical lens at too great of an angle to each other.

In some implementations, the RL may pass through a cylindrical lens and then be mixed with the LO before being incident on the line scan array.

The line scan arrays may be based on any material technologies, including, CMOS, CCD, SiPM, InGaAs, and others.

In some implementations, the receiver may include more than one LO. Additional LOs could mix with the receive light on different spatial parts of the detector array. They could also be changed in time where one LO could be mixed with the RL at a given point in time and subsequent points in time another LO could be used.

In some implementations, multiple wavelengths could be used for either the transmitted/received signal and/or the LO. Multiple wavelengths allow for higher dimensional encoding, meaning additional channels increases the overall capacity of the data transfer system. Multiple wavelengths could be received by different parts of the receiver array with a single LO frequency. Alternatively, different LOs at different frequencies could be used with different transmitted wavelengths. The different wavelengths could be received by different parts of the same array or by different arrays.

In some implementations, there could be multiple input and multiple output (MIMO) transmitters and receivers. Multiple detector arrays could provide spatial diversity and each spatial channel from each array could cover a different receive area. One or more LOs could be used to mix with the RL. Multiple transmitters pointing in different spatial directions could also be used.

Fiber in Receiver

Even though the description has described free space implementations of the coherent receiver, some embodiments may use fiber optics in the receiver. Fiber optics may be used to carry light from the LO to the detector array or to collect RL and carry it to the detector array. The fiber optics may be single mode or multi-mode.

In some embodiments, multi-mode fibers may be used as the transmission medium to carry light from the transmitter to the receiver. Within the receiver the light may exit the multimode fiber, be mixed with light from the LO and then be incident on the detector array. The spatial fringes may then be detected by the configuration of a switch fabric and the PC's. Data may then be encoded on the RL and detected via changes in the fringes. The switch fabric may be changed over time to adjust for changes in the fringes due to changes in the position of the multimode transmission fiber, change in the transmitted light or changes in the LO.

In some embodiments, multi-mode fiber(s) may be used to carry light from free space optics in the receiver to the detector array. That is, RL may be focused by one or more free space optics onto a multi-mode fiber so that the fiber collects the light and then transmits it some distance whereupon the light exits the multi-mode fiber, may pass through zero, one, or several free space optics, mix with light from the LO and be incident on the detector array.

Spatial Coherence and Spatial Modes

The description thus far has described complete spatial coherence for both the LO and the RL. The calculations for fringe spacing and pattern on the detector assume plane waves, which is accurate for beams that are converging or diverging slowly (i.e., over the aperture of the detector, the beam is roughly planar in nature). This does not need to be the case. The LO and RL are spatially coherent across the spatial size of a single detector or pixel and for the time duration of a single acquisition by the detector or electronic circuits connected to the detector. Furthermore, even degradation beyond these limits will result in merely diminished fringe contrast; there may still be sufficient fringe contrast for signal detection for cases where the spatial coherence across the detector is not complete or the temporal coherence is less than the integration or detection time of the detector or associated electronics.

Figure 12:
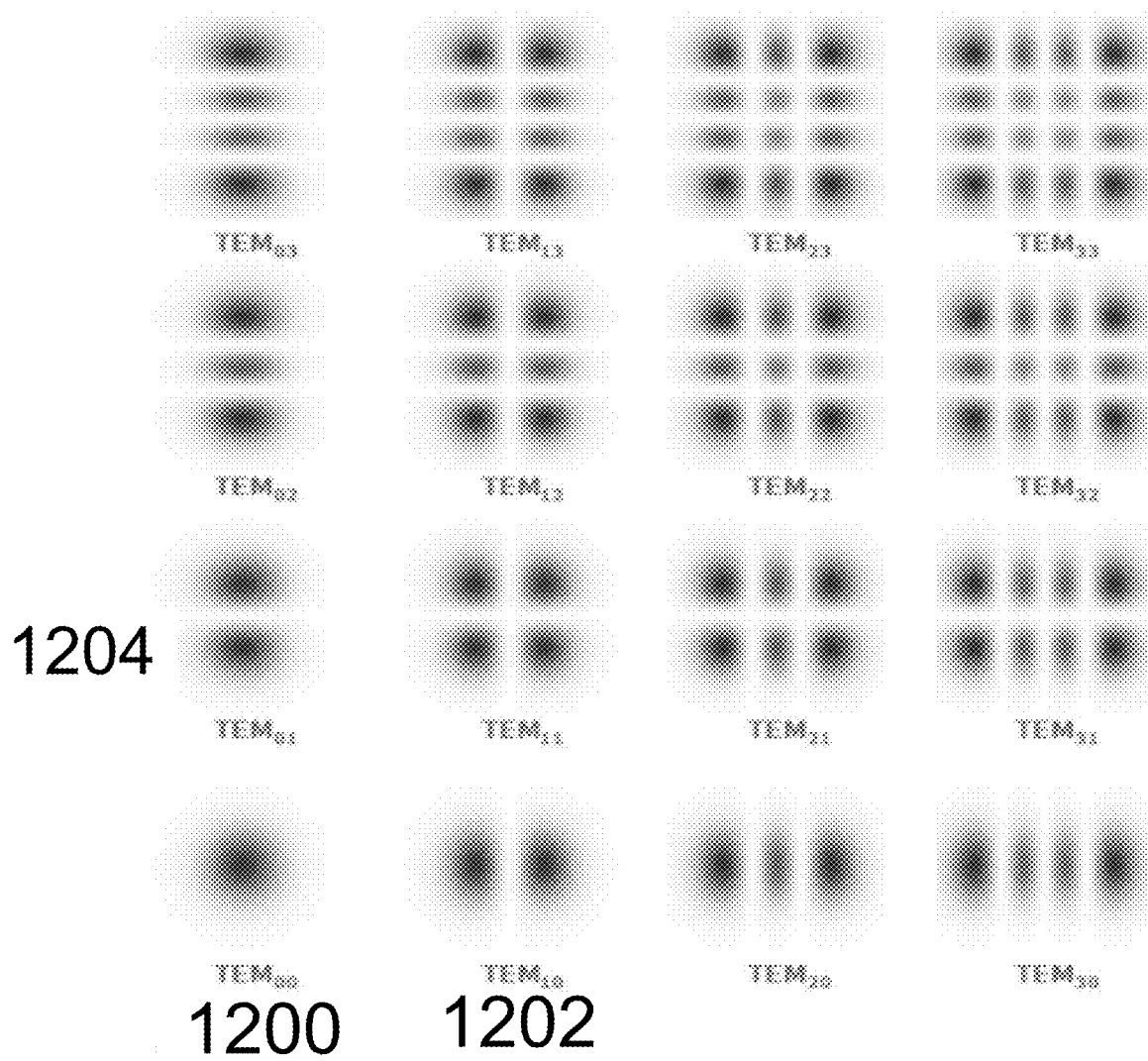
FIG. 12 shows a chart of several of the higher order transverse electromagnetic (TEM) modes, according to various examples.

A single spatial mode has been assumed thus far, although it is not required that this be a specific mode or that it be a pure spatial mode. For example, typically the lowest order spatial mode, a TEM00 mode is used as that it what couples into a single mode fiber. Other spatial modes such as higher order Hermite-Gauss or Laguerre-Gauss beams could also be used as they will also interfere with each other spatially in the same way as the lowest order modes. FIG. 12 shows a chart of several of the higher order TEM modes. The standard Gaussian beam 1200 is TEM00, while the next two higher order modes are TEM01 1204 and TEM10 1202. Additionally, using some of these higher order modes could result in an improvement in mode stability over a turbulent channel as it has been shown that Laguerre-Gauss beams typically suffer less decoherence over a turbulent channel then Gaussian beams (CITE).

Atmospheric Distortions

Atmospheric distortions, sometimes referred to as scintillation, are one effect that will modify the RL so that is it no longer a plane wave. These distortions are due to variations in the index of refraction in the propagation medium or atmosphere that cause different parts of the beam to experience different effective path lengths. This leads to self-interference at the receiver which may appear as "blinking" of the RL or bright and dark spots across the beam.

Figure 13A:
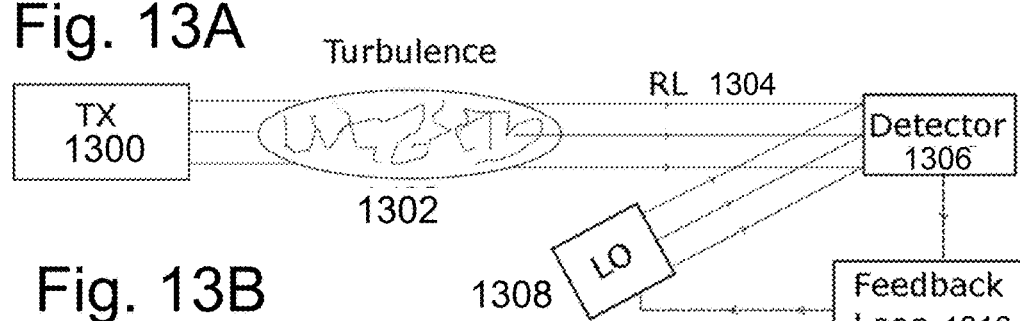
FIGS. 13A and 13B illustrate an effect of atmospheric turbulence, according to other examples.
Figure 13B:
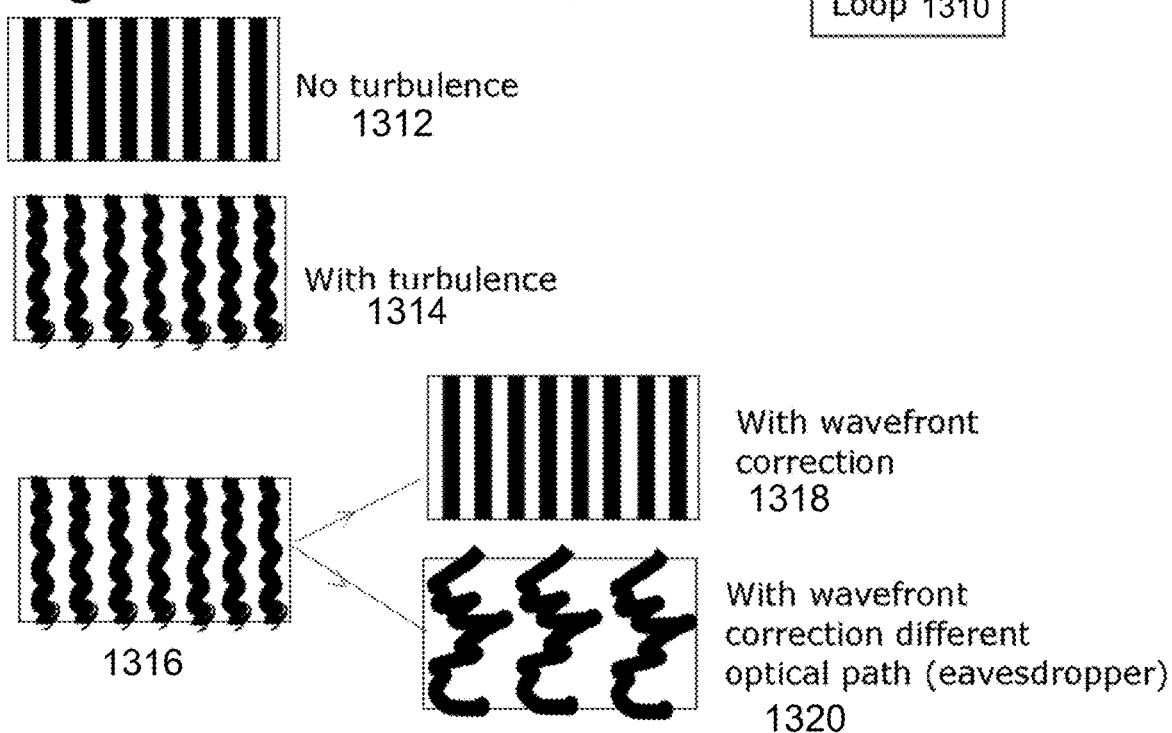

FIGS. 13A and 13B shows one possible effect of atmospheric turbulence. In FIG. 13A the transmitter 1300 emits the signal, which travels through some amount of turbulence 1302 in the atmosphere. The RL 1304 is mixed with the LO 1308 in the usual way on the detector 1306. Depending on the BER or another metric, the feedback loop 1310 (a feedback circuit) can be used to configure the detector elements as described below. FIG. 13B shows one potential difference in the fringe shape across the detector without turbulence 1312 versus with turbulence 1314.

In some implementations, atmospheric distortions can be compensated for by configuring the DEs to match the constructive and destructive interference across the array. This can be done in conjunction with the fringe generated by the LO. That is, the atmospheric distortions may modify the fringes from the LO plus RL interference, but the resulting fringes can still be mapped and the data extracted.

In some implementations, a beamsplitter may be used to pick off some portion of the interfered beams and image them onto an array that is used just for configuring the DEs in the receiver array. The beamsplitter may be a power beamsplitter, a wavelength dependent beamsplitter or a polarization dependent beamsplitter. There may be additional optics between the beamsplitter and the array. The output of the array may then go to a processor that uses the received image information to reconfigure the DE or otherwise modify the control portion of the system. This may be done at high frame rates as needed to compensate for changes in the distortion that is being compensated for.

In some implementations, the atmospheric distortion may be used as an encryption method for the optical link. The atmospheric path between the two ends of an optical link is unique. Any eavesdropper will experience a different optical path. This uniqueness may be used to help encrypt the data being transmitted across this particular link. There are numerous ways this may be implemented. For example, one end of the link may transmit a known data pattern and the other end may determine the atmospheric distortion based on interference pattern received by the detector array. This information may then be used to pre-distort a set of data that is transmitted back to the original end of the link. This data will then arrive undistorted at the end of link. This is shown in FIG. 13B. The pre-distorted data 1316 is calculated from a set of data that measured the atmospheric distortion. It is then sent across the channel and when measured by the coherent detector results in an undistorted pattern 1318. Any eavesdropper at a different location who measures the data from the channel on their coherent detector will experience even more distortion 1320 and will not be able to decrypt. At any other location the pre-distortion along with the different optical path will result in data that is still distorted. In some implementations the two ends of the link may communicate data that includes information about the atmosphere at either end point or along the path between the two endpoints.

In some examples, then, the feedback loop 1310 (feedback circuit) may be configured to determine a metric that indicates an effect of atmospheric distortion on light from an external source, and configure at least some of the DEs of the detector 1306 to compensate for the effect of atmospheric distortion. In some examples in which the atmospheric distortion is used as an encryption method, the feedback loop may be configured to communicate the metric (directly or indirectly such as via a local transmitter) to the external source. The external source, then, may be configured to apply a pre-distortion to further light according to the metric (fully or partially) to encrypt the light such that the atmospheric distortion has at least reduced (if not eliminated) the pre-distortion when received at the detector array. In some examples, the pre-distortion may be applied at a rate corresponding to a rate of atmospheric change time constant, or the pre-distortion may be applied at a substantially lower rate.

For implementations where encryption is important, it may be advantageous to operate the system at the lowest launch power that still provides enough SNR to meet the FEC threshold. The endpoints of the link may signal to each other to adjust the launch power level up or down to stay within a specified bit error rate range. This may further complicate any efforts to eavesdrop as there will be a limited physical range where there are sufficient signal photons and, in general, the number of signal photons will be quite low compared to the number of noise photons.

This encryption implementation may not be unbreakable in the quantum sense, but may be physically impractical to break. In order to obtain enough information to decode the data in post processing, the detector array would need to acquire most or all of the wavefront at the data rate. The basis of various example implementations is to enable data rate transmission at rates that are much higher than the achievable frame rate of the camera, typically by orders of magnitude, so building a camera with a frame rate that operates at the data rate will be extremely difficult. Furthermore, the probability that such a camera could be built without the operators of this coherent receiver being aware of their existence, is quite low.

Maximum Data Rate

Existing DBFSO systems operate in the 100 megabits per second (Mbps) to 1 gigabits per second (Gbps) data rate range. Some example implementations of the present disclosure have been described with those data rates in mind. However, the upper limit on the data rate for the optical links described herein is on the order of $10^{23}$ bits per second. To reach this bit rate may use a combination of bit rate per wavelength, number of wavelengths, number of polarizations, and number of spatial modes. Single element detectors already operate up to 100 Gbps and Gigapixel cameras exist. Converging these two provides $10^9*10^{11}=10^{20}$ bits per second (bps). Advances beyond that will enable at least $10^{23}$ bps. In various examples, then, the speed of each DE may be greater than 0.1 Gbps, 1 Gbps, 10 Gbps, 100 Gbps, 1,000 Gbps, 10,000 Gbps, or 100,000 Gbps. In these and similar examples, an optical receiver of multiple DEs (e.g., 100 thousand to 1 billion) may achieve an optical reception speed of greater than 1e13 bps, 1e14 bps, 1e15 bps, 1e16 bps, 1e17 bps, 1e18 bps, 1e19 bps, 1e20 bps, 1e21 bps, 1e22 bps, or 1e23 bps.

Example Implementations

Below are some example implementations for various applications. This is not an exhaustive list, but meant to be representative of possible implementations and use cases.
Long Distance FSO or DBFSO This set of implementations is an extension of a diverged beam free space optical (DBFSO) communications system such as that described in U.S. Pat. No. 9,847,834, issued Dec. 19, 2017, the content of which is incorporated herein by reference. The number of photons per bit has been a limitation for these systems. For example, in the first 1 Gbps system the minimum receive power is approximately 1 microWatt, which corresponds to about 4,300 photons/bit. Using coherent detection, it may be possible to lower the number of photons/bit to as low as 10. This is more than two orders of magnitude; all else remaining equal, this system would have 10 times the range of a current DBFSO system.

Figure 14:
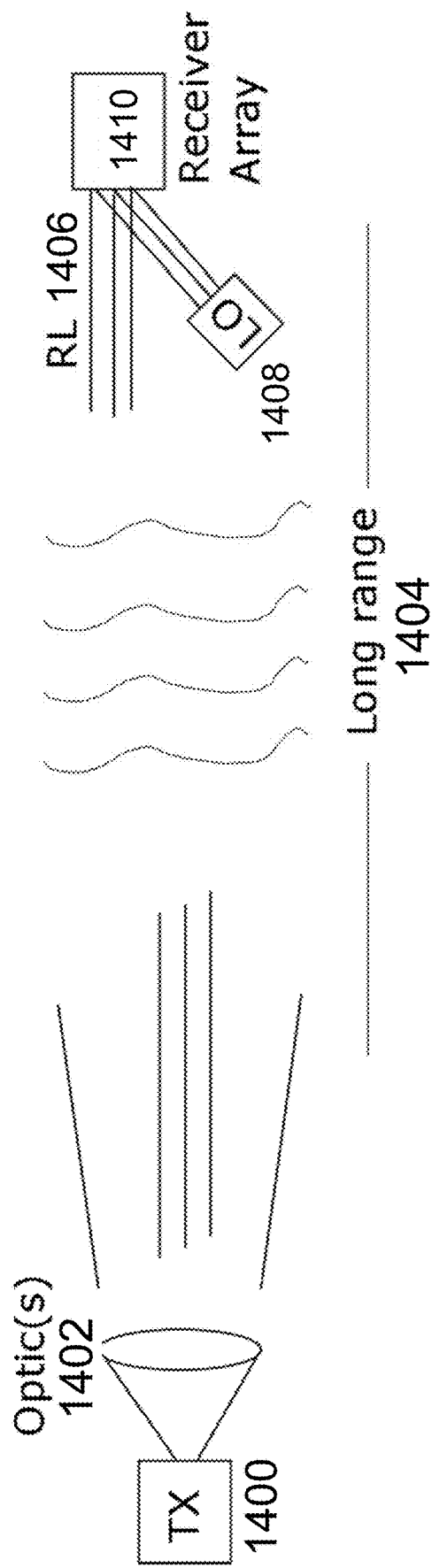
FIG. 14 illustrates a diverged beam free space optical (DBFSO) communications system, according to various example implementations.

An example system is shown in FIG. 14. Light from a transmitter 1400 is collimated, focused, or diverged with a lens or optical system 1402 and travels a long range 1404 through free-space before entering the receiver. The RL 1406 is mixed with the LO 1408 on the receiver array 1410. This is just one potential way of realizing a long distance coherent scheme. Some others are described below.

The transmitter will need to be at least partially coherent, and may be mostly coherent. This could be built using a variety of implementations. One example is based on standard fiber optic components in the C band (1530-1560 nm) with a single mode laser, any of various types of modulators and zero to many amplifiers. Some example amplifiers are EDFAs, SOAs (semiconductor optical amplifiers), and others. Optics may be used to collimate or partially collimated (DBFSO) the output beam.

This system can be implemented with or without receive optics. The receive optics may include one or more lenses and/or mirrors. An implementation without optics may have a very large field of view, limited only by the acceptance angle of the detector array. The detector array could be quite large as well, potentially many centimeters across, even a meter or more. The cases with optics will have a smaller field of view do to the amplification (or light gathering power) of the optics. The fringe pattern on the detector array may be modified to account for aberration in the optics. For example, the spherical aberration in lenses will lead to a curvature of the fringe pattern between the LO and RL. This can be measured or calculated and then fed into the switch fabric so that fringe peaks and troughs are still summed to the correct DEs.
Short Range FSO or DBFSO for AR/VR and Other Applications Coherent detection may enable high speed, low latency communications for AR/VR and other applications. Consider first the case of AR/VR headsets where the goals are light weight and minimum encumberments for the user. Since computing power is still heavy and uses significant power the typical implementation has the computer separate from the user with a communication path in between. RF communications have been limited by low bandwidth and high latency. Optical communications can solve both of these issues. DBFSO can work, but may still include some optics for gain and has a higher number of photons per bit. Coherent detection may reduce the number of photons per bit and/or increase the acceptance angle of the receiver. This in turn may reduce the amount of equipment in the headset (and hence the weight and/or power consumption) and increase the range (distance and/or angle) that the headset can work over relative to a base station.

FIG. 15A shows an example of an AR/VR user 1508 with a receiver 1506. The base station transmitter 1500 emits the signal in a broad angular range so that some of the RL 1502 lands on the receiver. The LO 1504 light is mixed on the receiver for coherent data detection.

One implementation is shown in FIG. 15B and would use a single mode diode laser as the local oscillator (LO) 1514 that illuminates the detector array 1516 at an angle outside of the acceptance angle for the RL 1512 emitted by the transmitter 1510. The transmitter 1510 may have some pointing ability. Fringe pattern (angle and other info) would be determined and then programmed into the switch array. Data would then be received at that given fringe pattern. As the user 1520 moved relative to the base station the fringe pattern will change and an angle-tuned pattern 1518 would be received. These changes would need to be detected and the switch array reprogrammed. This detection and reprogramming rate can range from 0 (static) up to the data rate (which may be 10 Gbps or higher). Most likely this rate is set by the speed of motion of the user relative to the base station and 100 Hz to 10's of kHz may be sufficient.

Other short range applications may include computer-to-computer such as in data centers or other locations. Use of coherent detection with an LO may allow many such links to run in the same room or space. Coherent transmitters may steer beams to a particular receiver. This coherent receiver can then preferentially detect transmissions from a particular transmitter. Light from other directions may then be ignored or suppressed relative to desired transmission path.

Other short range applications may include consumer devices such as smart phones, TVs, video recording and playback devices, cameras, and other devices.
LIDAR In this case the LO and the RL may come from the same light source. For LIDAR the light is generated and detected at the same location, so a single laser may be used to generate the LIDAR pulses which in turn become the RL and generate the LO. An example of this is shown in FIG. 16A. A laser/transmitter 1600 emits light that is split by a beamsplitter 1602 or splitter optic. Some of the light becomes the LO 1604 while some gets sent into a scanner 1612. The scanner can send the light out in a variety of different angles 1614 where it reflects off a distant object and returns. The RL 1610 then is this reflected light that gets mixed on a second beamsplitter 1606 or beam splitting optic and received by the receiver 1608. In some configurations a seed laser may generate light that is split into two or more paths. Light on these paths may be amplified by an optical amplifier such as an EDFA, SOA, Raman amplifier, or other methods and then launched as LIDAR pulses and/or used as the LO to illuminated the detector array in the receiver.

Several groups have proposed and built phased array systems for LIDAR. Phased array approaches allow a beam to be steered by using multiple apertures with controlled phase delays between the various apertures. An example of a phased array approach is shown in FIG. 16B. Here the laser 1616 emits light which gets split by a beamsplitter 1618. Some of this light becomes the LO 1624 while some is sent to the phased array 1620. The phased array 1620 directs and potentially shapes the beam. It is reflected by distant objects and returns to the receiver 1622 where it is mixed with the LO 1624. Phased arrays can be used for both transmission and reception of light. A phased array can be easily implemented on the transmit side because the angular control is set by the maximum extent of the various apertures. There need to be sufficient apertures across the extent, but it does not need to be continuous and the number and periodicity of the apertures sets the beam width and side lobes. These apertures are typically single mode so that the phase can be controlled and maintained.

This approach is also used on the receive side, however it does not fare well here, because the total receive aperture is quite low. Since the receive apertures must be single mode to allow phase control, they are quite small, on the order of 10 microns or less and even having 1000's of them will still result in a small overall aperture while significantly increasing the complexity of the phase adjust systems since each aperture will need its own phase adjust.

Example implementations of the present disclosure overcome this problem since we can easily have millions to billions of apertures, even though each aperture is on the order of the wavelength (1 micron or so). Existing commercial arrays already have 10's to 100's of megapixels and it will be possible to build 1 to 100's of gigapixel arrays.

These implementations can be used in a variety of applications including automotive and transportation applications. Other implementations may be used in industrial applications.

Many modifications and other implementations of the disclosure set forth herein will come to mind to one skilled in the art to which this disclosures pertain having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An optical receiver comprising:
a detector array of multiple detector elements, the detector array configured to receive light from an external source, mix the light with light from a local oscillator to generate a spatial fringe across the detector array, and the multiple detector elements configured to convert respective portions of the spatial fringe incident on the multiple detector elements to corresponding electrical signals; and
processing circuits coupled to the multiple detector elements, and configured to process the electrical signals, including the processing circuits configured to sum those of the corresponding electrical signals from one or more of the multiple detectors, and subtract the sum from a second sum of those of the corresponding electrical signals from one or more other of the multiple detectors.

2. The optical receiver of claim 1, wherein the detector array includes a quad detector to enable configured to enable the optical receiver to track the external source.

3. The optical receiver of claim 1 further comprising a switch fabric via which the multiple detector elements are coupled to the processing circuits, the switch fabric programmable to couple the multiple detector elements to different ones of the processing circuits.

4. The optical receiver of claim 1 further comprising one or more switches configured to connect adjacent detector elements of the multiple detector elements.

5. The optical receiver of claim 1, wherein the multiple detector elements are silicon-based detector elements.

6. The optical receiver of claim 5, wherein the detector array is built on Complementary metal-oxide-semiconductor (CMOS) technology in which each detector element of the silicon-based detector elements includes a set of transistors operable as a switch to couple the detector element to one or more of the processing circuits.

7. The optical receiver of claim 5, wherein the detector array is built on charge-coupled device (CCD) technology in which the corresponding electrical signals are electric currents, the sum subtracted from the second sum produces a result electric current that is then digitized.

8. The optical receiver of claim 1, wherein the multiple detector elements are InGaAs-based detector elements.

9. The optical receiver of claim 1 further comprising:
a feedback circuit coupled to the detector and configured to determine a metric from the corresponding electrical signals that indicates an effect of atmospheric distortion on the light from the external source, the feedback circuit further configured to configure at least some of the multiple detector elements to compensate for the effect of atmospheric distortion.

10. The optical receiver of claim 1 further comprising:
a feedback circuit coupled to the detector and configured to determine a metric from the corresponding electrical signals that indicates an effect of atmospheric distortion on the light from the external source,
wherein the feedback circuit is further configured to communicate the metric to the external source, and the external source configured to apply a pre-distortion to further light according to the metric such that the atmospheric distortion has at least reduced the pre-distortion when received at the detector array.

11. The optical receiver of claim 1 further comprising multiple local oscillators including the local oscillator, the multiple local oscillators having different frequencies and usable with light having different transmitted wavelengths.

12. The optical receiver of claim 1, wherein the multiple detector elements are in number greater than 100 thousand, 1 million, 10 million, 100 million, or 1 billion, each of which has a speed greater than 0.1 gigabits per second (Gbps), 1 Gbps, 10 Gbps, 100 Gbps, 1,000 Gbps, 10,000 Gbps, or 100,000 Gbps, thereby enabling the optical receiver to achieve an optical reception speed of greater than 1e13 bits per second (bps), 1e14 bps, 1e15 bps, 1e16 bps, 1e17 bps, 1e18 bps, 1e19 bps, 1e20 bps, 1e21 bps, 1e22 bps, or 1e23 bps.

13. A system for augmented or virtual reality comprising the optical receiver of claim 1, and further comprising an augmented or virtual reality headset equipped with the optical receiver to enable optical communication with at least the external source that is a base station.

14. A system comprising:
a source of light configured to emit light;
a beamsplitter or splitter optic configured to split the light into light that is launched toward a target, and light that is used as a local oscillator;
a detector array of multiple detector elements, the detector array configured to receive light incident on the target in a return path, mix the light incident on the target with the light used as the local oscillator to generate a spatial fringe across the detector array, and the multiple detector elements configured to convert respective portions of the spatial fringe incident on the multiple detector elements to corresponding electrical signals; and
processing circuits coupled to the multiple detector elements, and configured to process the electrical signals, including the processing circuits configured to sum those of the corresponding electrical signals from one or more of the multiple detectors, and subtract the sum from a second sum of those of the corresponding electrical signals from one or more other of the multiple detectors.

15. The system of claim 14 configured as a light detection and ranging (LIDAR) system.

16. The system of claim 14, wherein the detector array includes a quad detector to enable configured to enable the optical receiver to track the external source.

17. The system of claim 14 further comprising a switch fabric via which the multiple detector elements are coupled to the processing circuits, the switch fabric programmable to couple the multiple detector elements to different ones of the processing circuits.

18. The system of claim 17 further comprising one or more switches configured to connect adjacent detector elements of the multiple detector elements.

19. The system of claim 14, wherein the multiple detector elements are silicon-based detector elements.

20. The system of claim 19, wherein the detector array is built on Complementary metal-oxide-semiconductor (CMOS) technology in which each detector element of the silicon-based detector elements includes a set of transistors operable as a switch to couple the detector element to one or more of the processing circuits.

21. The system of claim 19, wherein the detector array is built on charge-coupled device (CCD) technology in which the corresponding electrical signals are electric currents, the sum subtracted from the second sum produces a result electric current that is then digitized.

22. The system of claim 14, wherein the multiple detector elements are InGaAs-based detector elements.

23. The system of claim 14 further comprising:
a feedback circuit coupled to the detector and configured to determine a metric from the corresponding electrical signals that indicates an effect of atmospheric distortion on the light from the external source, the feedback circuit further configured to configure at least some of the multiple detector elements to compensate for the effect of atmospheric distortion.

24. The system of claim 14 further comprising multiple local oscillators including the local oscillator, the multiple local oscillators having different frequencies and usable with light having different transmitted wavelengths.

* * * * *

UNITED STATES PATENT AND TRADEMARK OFFICE
CERTIFICATE OF CORRECTION

PATENT NO. : 10,965,379 B2
APPLICATION NO. : 16/706233
DATED : March 30, 2021
INVENTOR(S) : William J. Brown et al.

It is certified that error appears in the above-identified patent and that said Letters Patent is hereby corrected as shown below:

On the Title Page

On the page 2, in Column 1, under item (56) "Other Publications", Line 2, delete "Transceiverr" and insert -- Transceiver --.

In the Specification

In Column 3, Line 26, delete "elements" and insert -- elements. --.

In Column 11, Line 35, delete ".r]" and insert -- $\cdot \vec{r}]$ --.

Signed and Sealed this
Twenty-fifth Day of June, 2024

*Katherine Kelly Vidal*

Katherine Kelly Vidal
*Director of the United States Patent and Trademark Office*